May 30, 1950 — O. S. FIELD — 2,509,632
AIRWAY TRAFFIC CONTROL SYSTEM
Filed Aug. 30, 1945 — 13 Sheets-Sheet 7

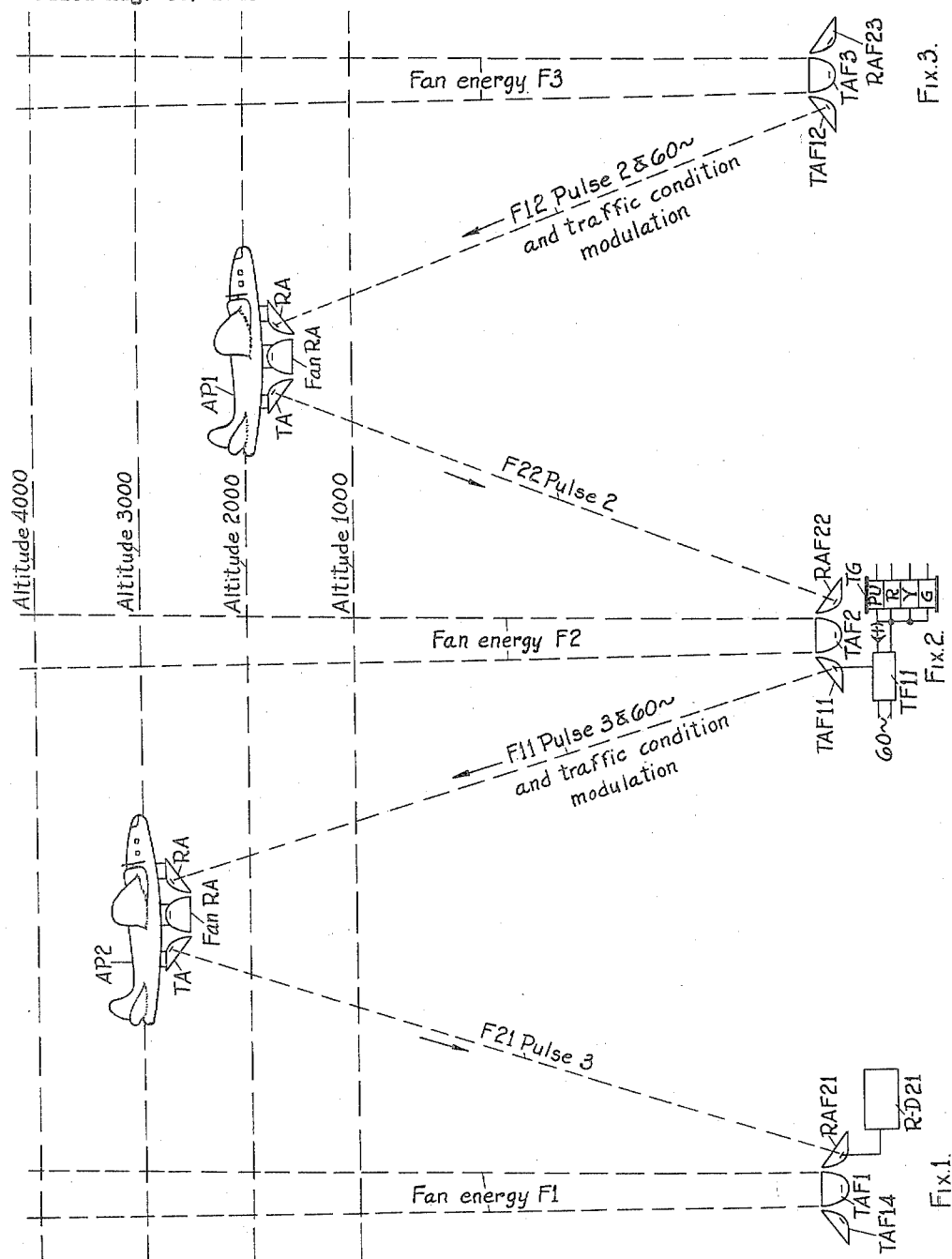

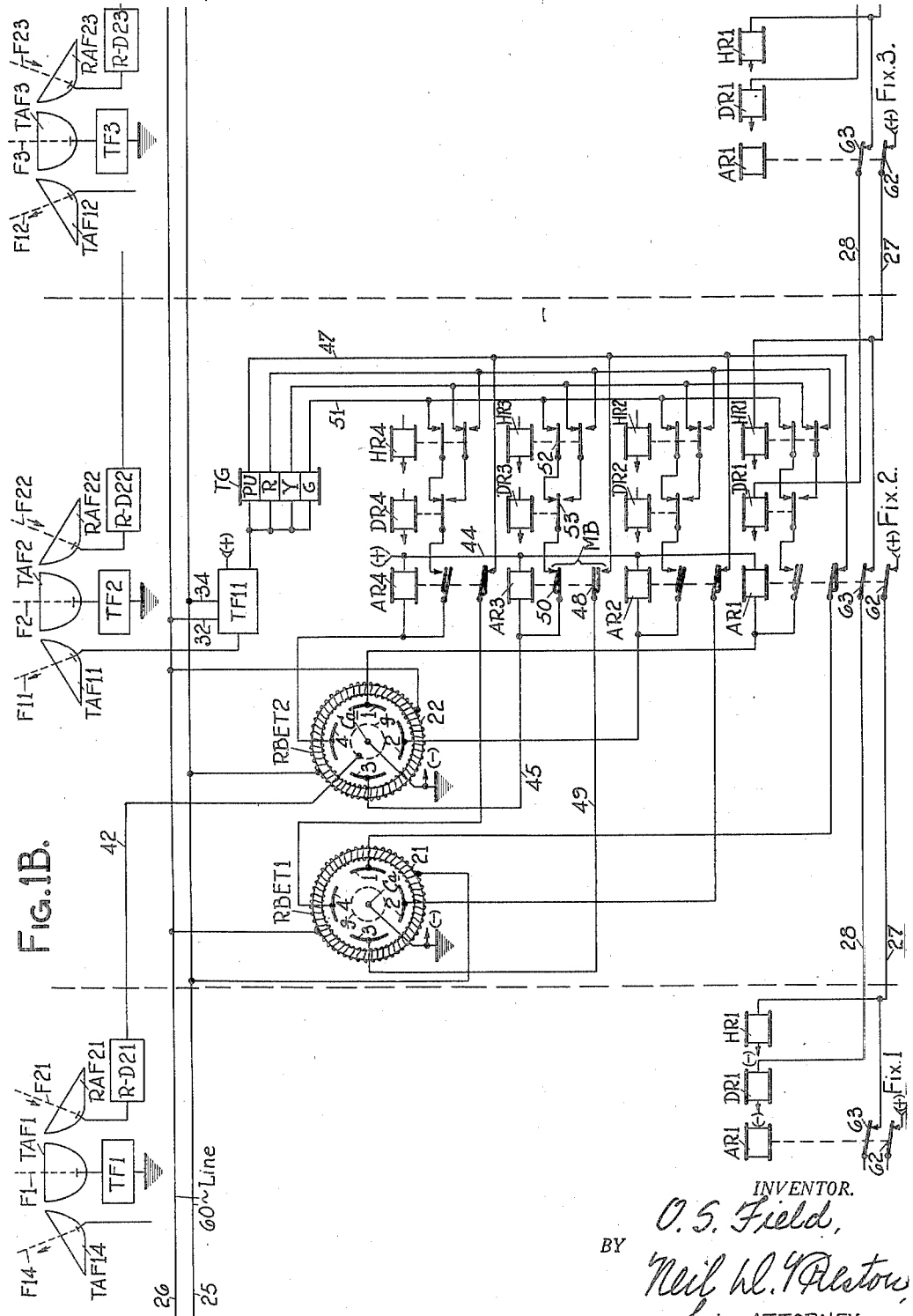

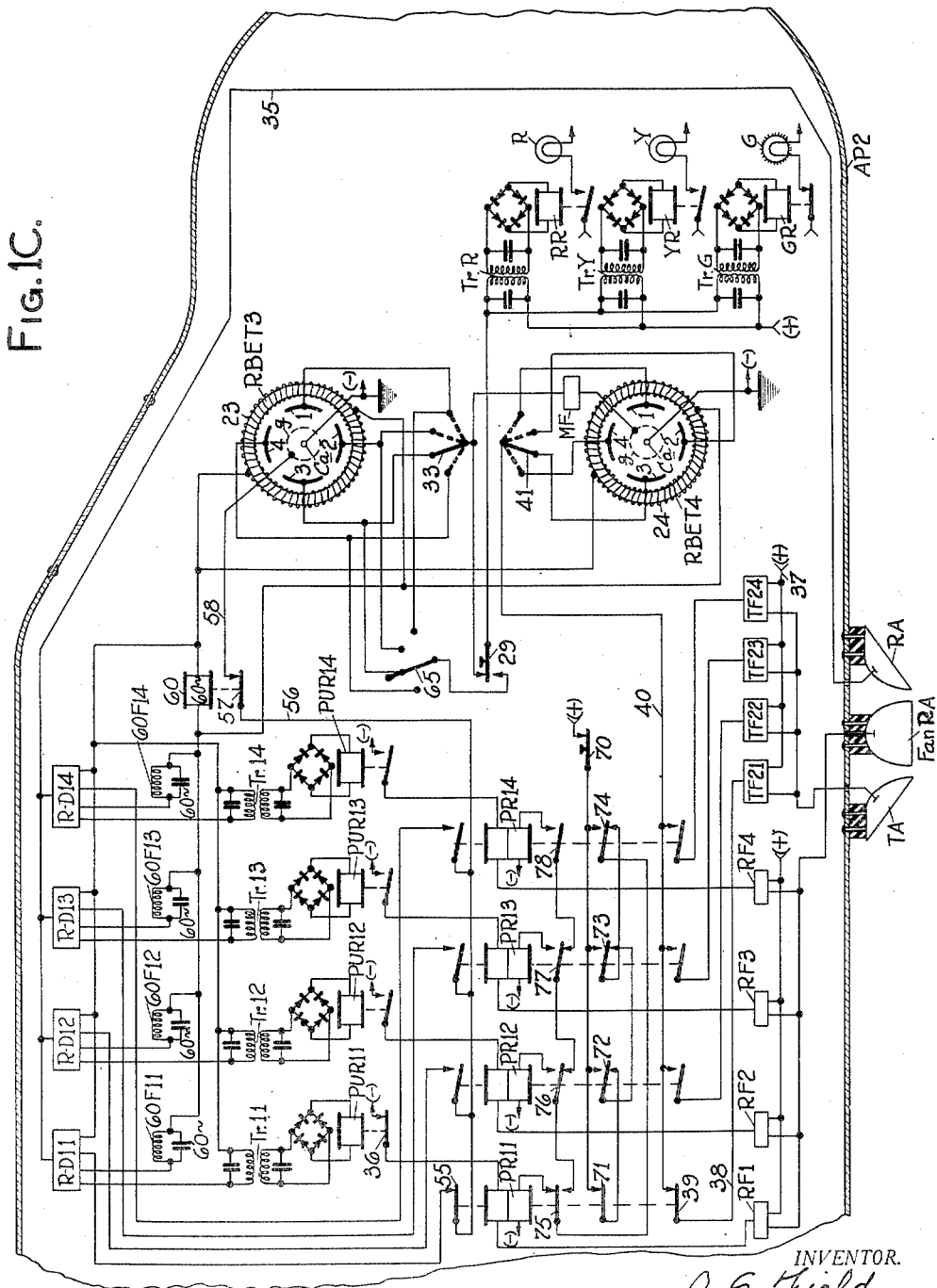

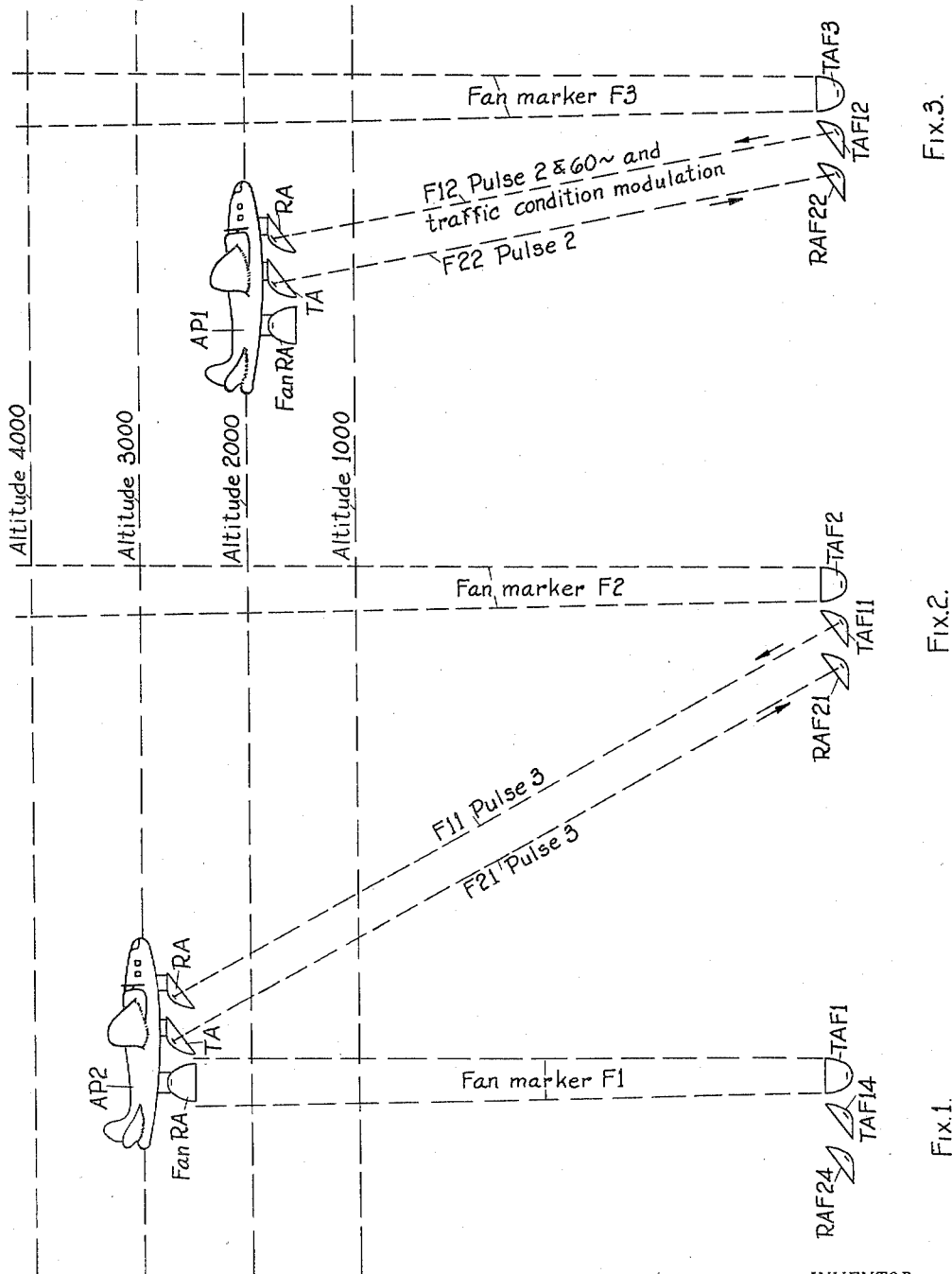

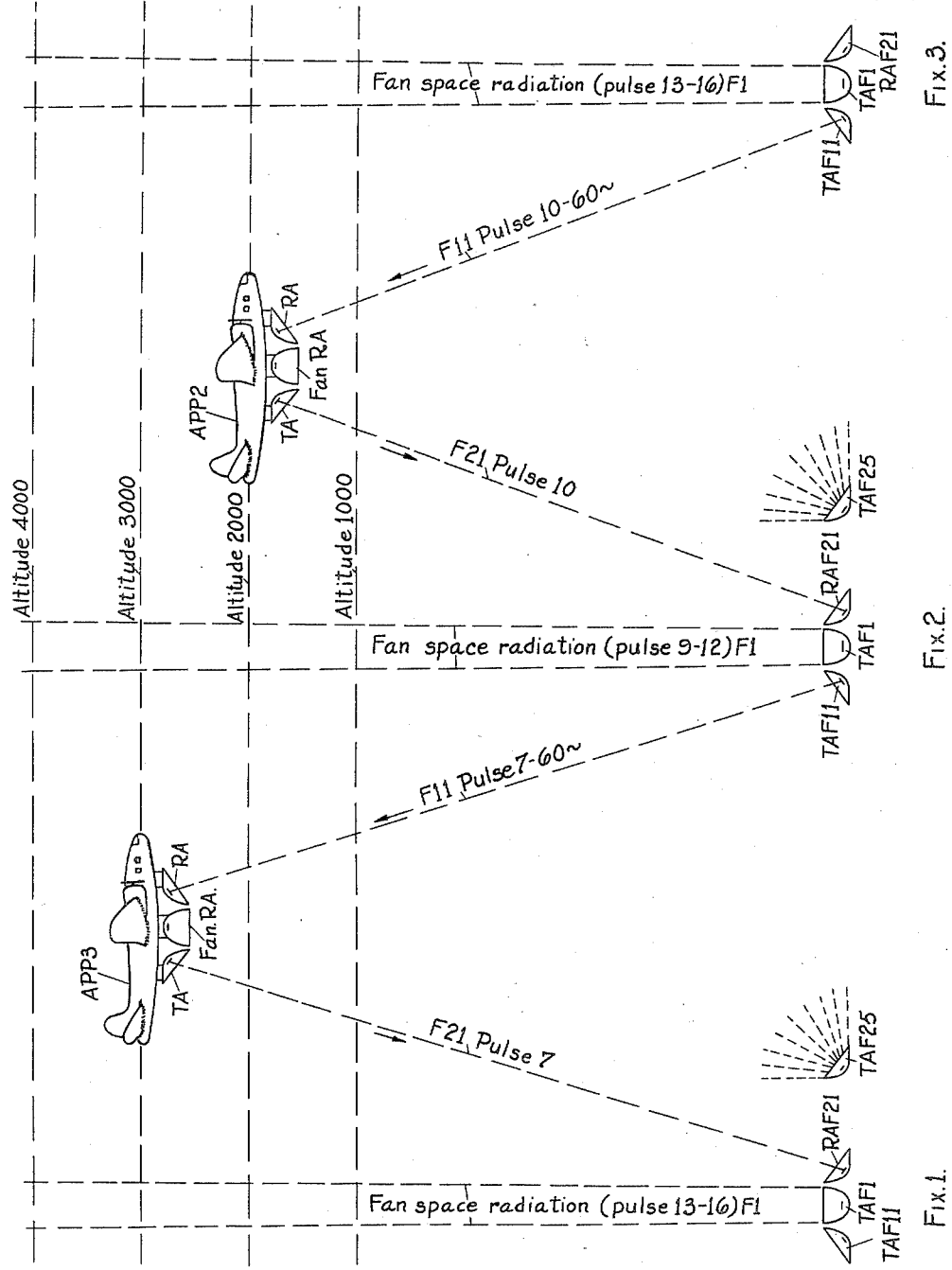

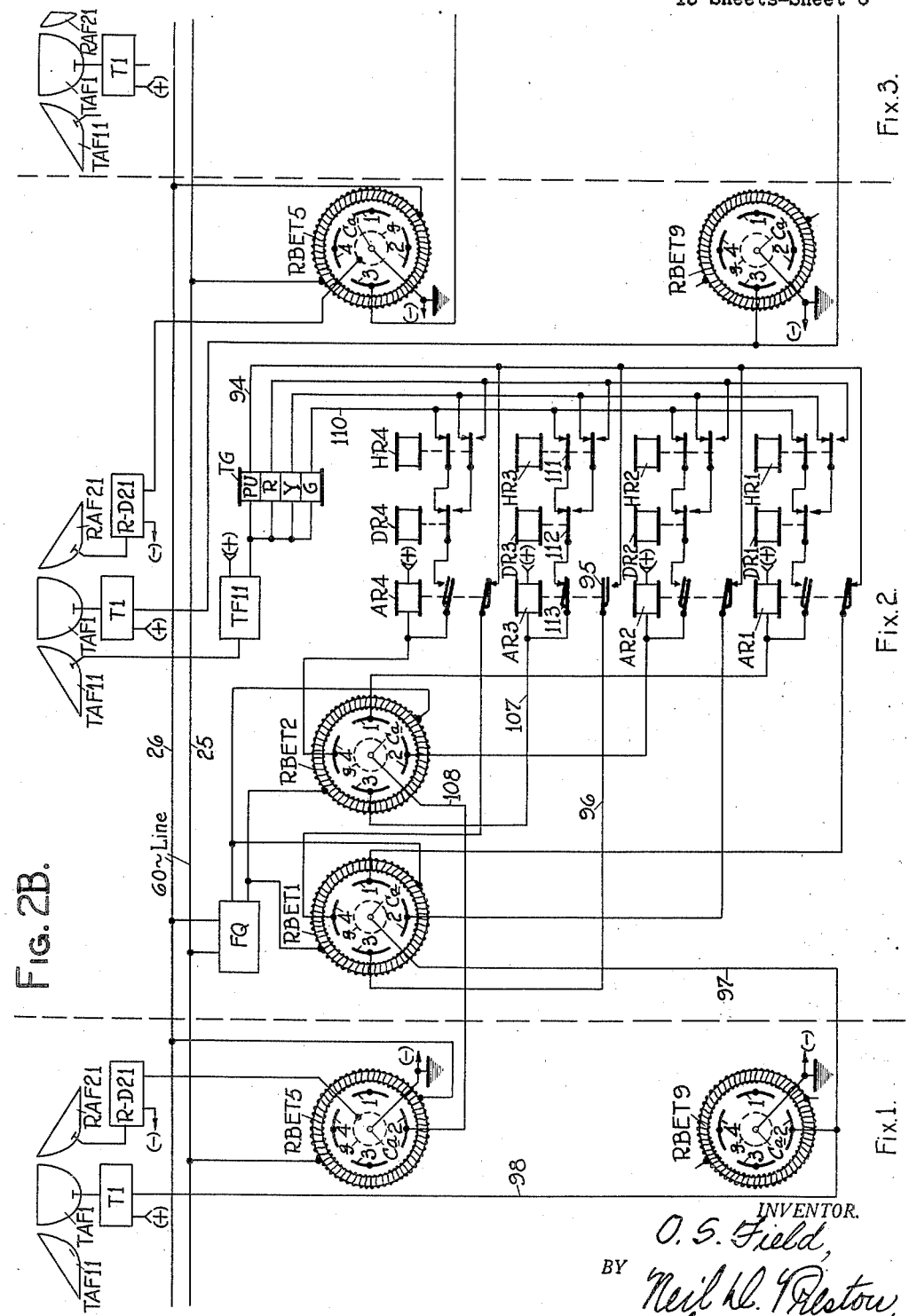

INVENTOR.
O. S. Field,
BY Neil W. Preston,
his ATTORNEY

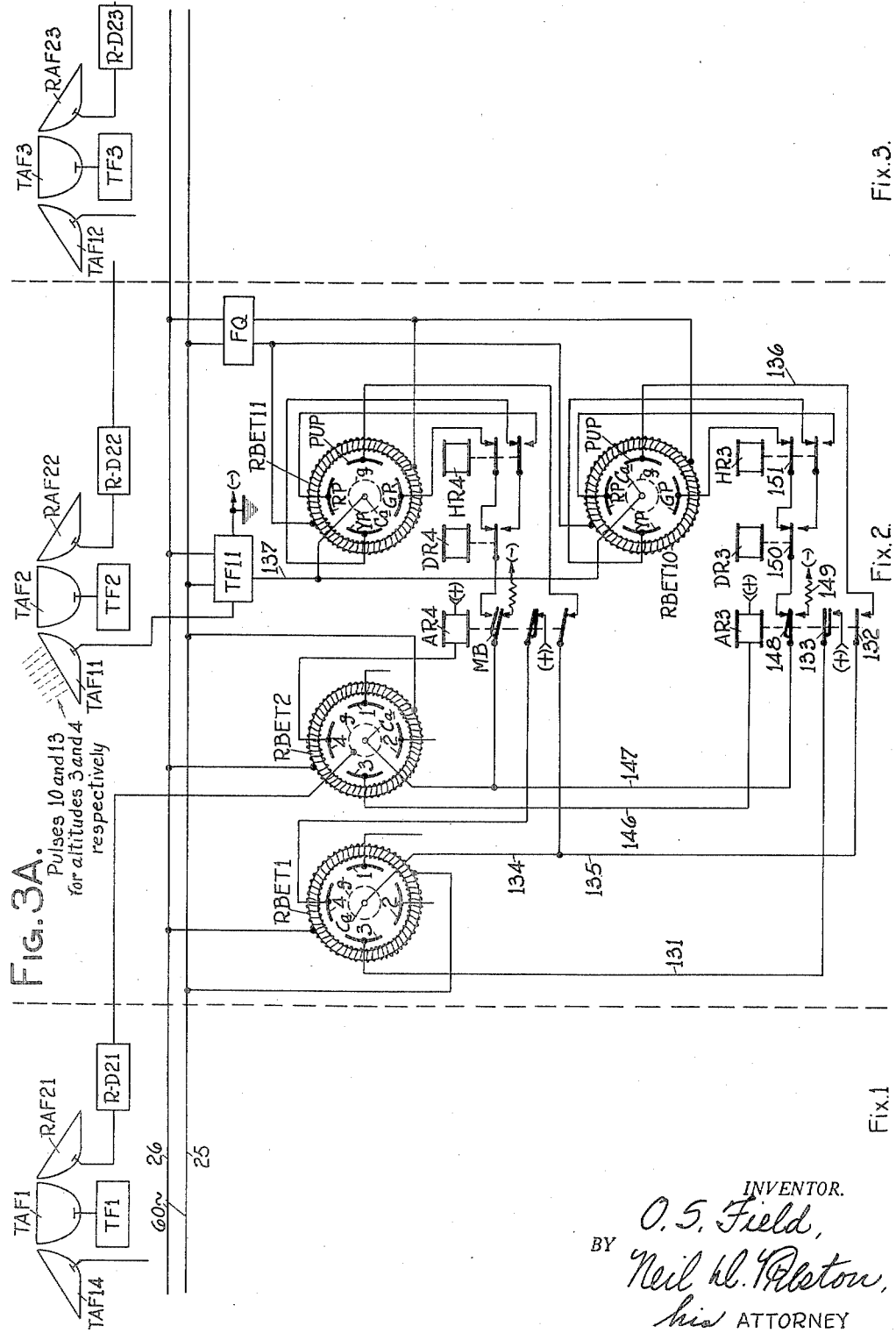

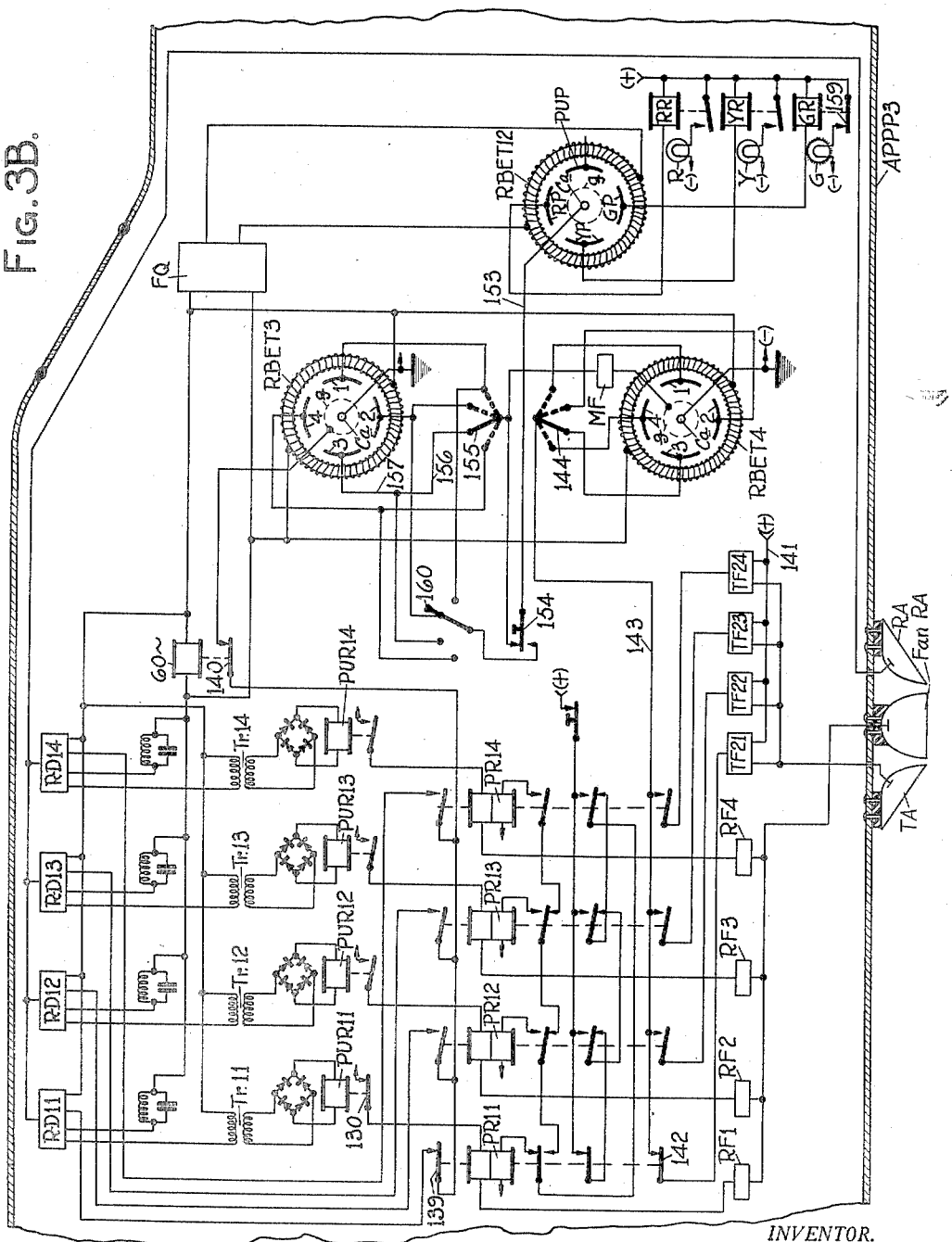

May 30, 1950     O. S. FIELD     2,509,632
AIRWAY TRAFFIC CONTROL SYSTEM
Filed Aug. 30, 1945     13 Sheets-Sheet 10
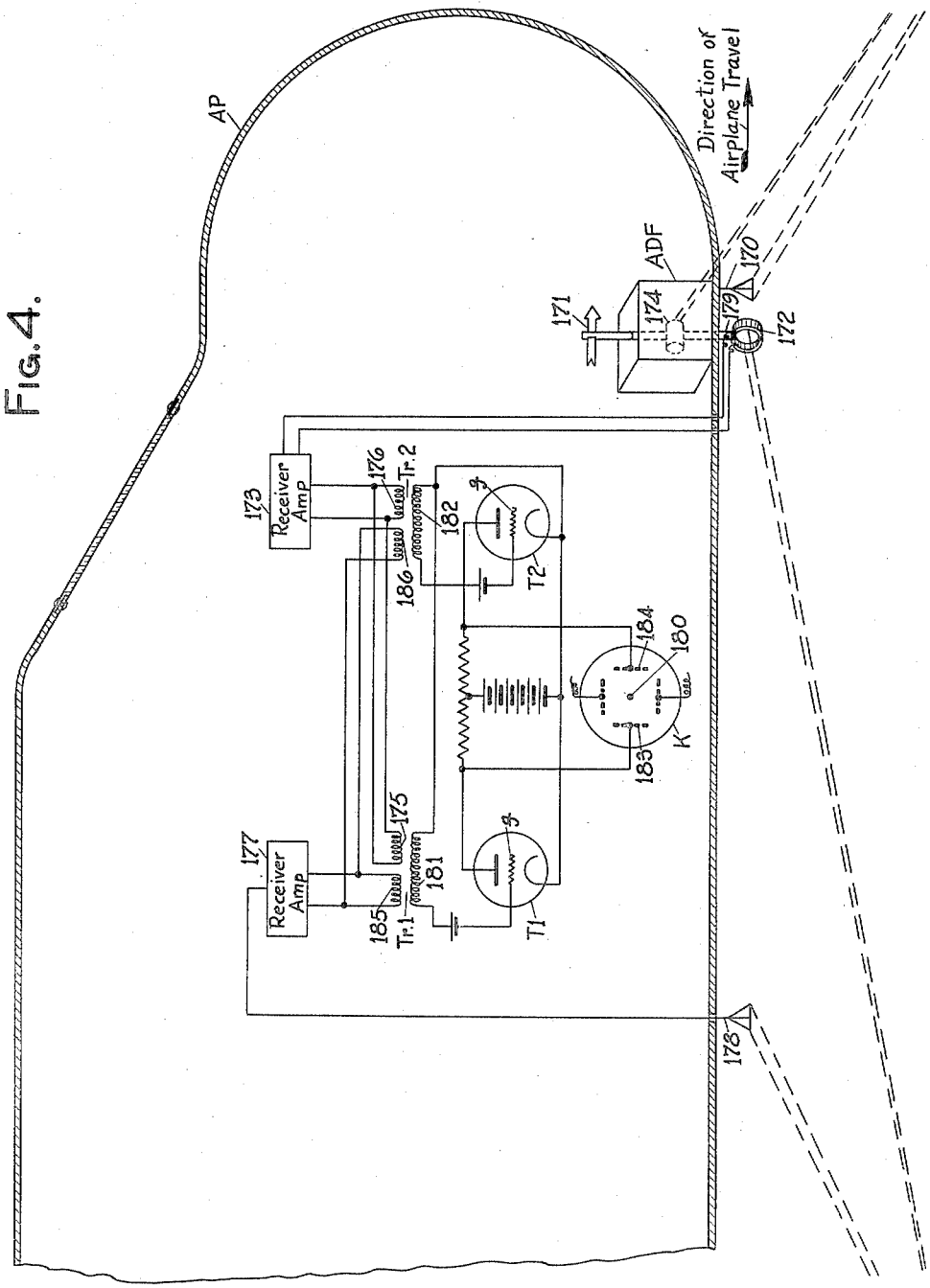
INVENTOR.
O. S. Field,
BY Neil W. Preston,
his ATTORNEY

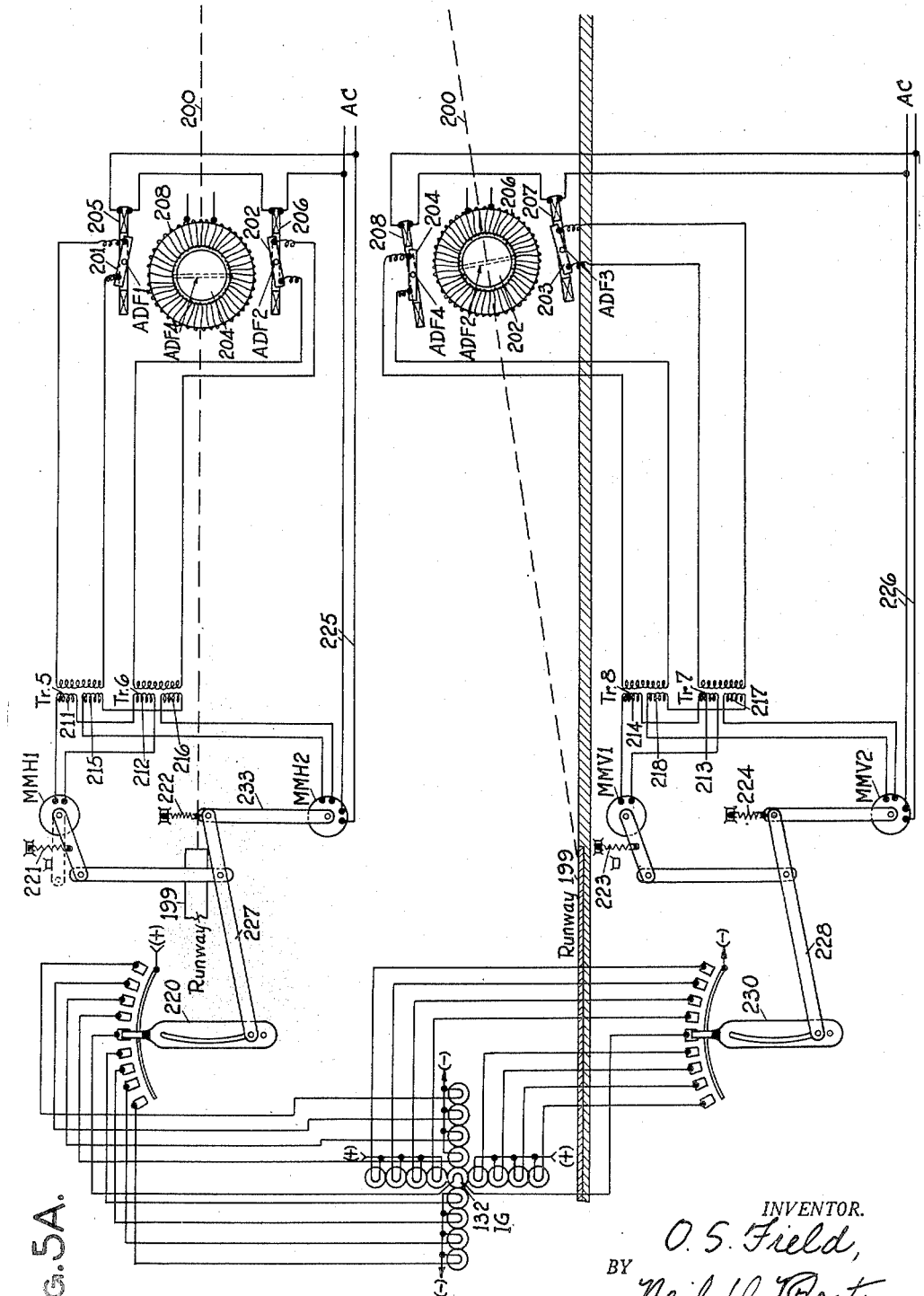

May 30, 1950     O. S. FIELD     2,509,632
AIRWAY TRAFFIC CONTROL SYSTEM

Filed Aug. 30, 1945     13 Sheets-Sheet 12

INVENTOR.
O. S. Field,
BY Neil D. Preston,
his ATTORNEY

May 30, 1950  O. S. FIELD  2,509,632
AIRWAY TRAFFIC CONTROL SYSTEM
Filed Aug. 30, 1945  13 Sheets—Sheet 13

Patented May 30, 1950

2,509,632

UNITED STATES PATENT OFFICE 2,509,632

AIRWAY TRAFFIC CONTROL SYSTEM

Oscar S. Field, Rochester, N. Y., assignor to General Railway Signal Company, Rochester, N. Y.

Application August 30, 1945, Serial No. 613,600

29 Claims. (Cl. 177—353)

This invention relates to air traffic or airplane cab signalling systems and more particularly to a system of this kind where the cab information is received by space radiation from a ground transmitter and is an improvement over the prior application of Field and Wight, Ser. No. 547,175, filed July 29, 1944, now Patent No. 2,458,361, dated January 4, 1949.

In an airplane cab signalling system of the type under consideration, if it is desired to divide a traffic route into block sections having a plurality of altitude routes over such traffic route, it is necessary to have a clear line of demarkation between successive blocks insofar as radio communication is concerned. That is, it is necessary to manifest in a particular block and on the ground the fact that there is an airplane flying in that block as well as the particular altitude at which it is flying and furthermore it is necessary for that airplane to communicate only with the ground located apparatus for that block so that the proper traffic condition is displayed in the cab of an airplane flying at that altitude in the block in the rear thereof.

In view of the foregoing, and other important considerations, it is proposed to provide at the junction between each pair of successive blocks a radio transmitting fan marker which emits space radiation energy in a fan-like radiation pattern crosswise of the air route so that the reception of such space radiation on the airplane is a clear manifestation that such airplane is entering that block. It is proposed to use this energy on the airplane where it is characterized in accordance with the altitude at which the airplane is flying, to then transmit such characterized radio energy back to the ground station for that block where this energy is transformed by additionally superimposing thereon information characteristic of traffic conditions in advance of that block for the particular altitude at which such airplane is flying. This space radiation energy is also distinctive for the particular block in which the airplane is flying especially insofar as several blocks both ahead and behind the airplane are concerned.

In view of the fact that the various kinds of distinctive characters that are to be transmitted by space radiation from a ground location to an airplane, and in the opposite direction, it is proposed to transmit such characters by either a synchronous type of distinctive control, which may for convenience be called the "time of impulse" method or a modulation type of distinctive control, or both. By the expression "time-of-impulse" is meant that successive cycles of time are each divided into a large number of impulse times, each impulse time of which may have ordinary energy or special energy of a character signifying a particular condition transmitted during such time, and by distinctive modulation is meant that either continuous energy or individual pulses of energy may be specially modulated to signify specific traffic conditions.

As another object of the present invention it is proposed to use these two distinctive energy transmission features in different co-related manners by, for instance, transmitting an altitude character by radio energy on a particular time-of-pulse period and by transmitting information identifying a particular block by either the transmission of energy on a particular time-of-pulse period or by modulating that energy at a particular frequency or both. In like manner it is proposed to transmit by space radiation the condition of traffic in one or more blocks in advance of a particular block to an airplane flying at a particular altitude in such block by either the time-of-impulse method or the modulation method or both.

As another object of the present invention it is proposed to allow a ground location to radiate space energy identifying a particular altitude and traffic conditions in advance thereof only if that ground station is then receiving radio energy identifying that same altitude from an airplane.

It is further proposed in accordance with the present invention to use the same radio beams that are transmitted from the first ground location in the rear and the first ground location in advance of an airplane for the purpose of manifesting on such airplane whether or not such airplane is flying directly over a route connecting such ground locations, that is, use the same space radiation for route designating and traffic condition manifesting purposes. It should be noted that the straight course finding portions of the complete system of this invention have been disclosed and claimed in my copending divisional application Ser. No. 123,845, filed October 27, 1949.

In accordance with another object of the present invention it is proposed to provide a suitable means for making a blind landing at an airfield when the airplane under consideration has completed its flight over a route or route portion.

Other objects, purposes and characteristic features of the present invention will in part be described hereinafter and will in part be understood from the accompanying drawings, in which—

Figs. 1A, 1B and 1C illustrate an airplane cab signalling system of the type employing distinctive carrier frequencies, or distinctive modulations of carrier frequencies, for manifestation of the particular block an airplane is flying in and the particular traffic condition existing in that block and employing time-of-impulse characters for identifying the particular altitude in which the airplane is flying;

Fig. 1D illustrates a modified form of the invention illustrated in Figs. 1A, 1B and 1C;

Figs. 2A, 2B and 2C illustrate a system similar to that shown in Figs. 1A, 1B and 1C except that successive block identification is transmitted by the time-of-impulse method which time-of-impulse method is also used for altitude identification and in which carrier frequency modulation is employed for transmitting distinctive conditions of traffic for one or more blocks in advance;

Figs. 3A and 3B illustrate a system wherein block identification is transmitted by carrier frequency modulation and wherein altitude identification and conditions of traffic in advance are distinctively transmitted by the time-of-impulse method;

Fig. 4 illustrates a system of route flying by the use of which a pilot may fly a straight line between two successive ground radio transmitting stations irrespective of a substantial tendency for the airplane to drift sidewise due to a side wind;

Figs. 5A, 5B and 5C illustrate a system for blind landing the airplane when it has reached the end of the route over which it is to travel.

Figure 2C:
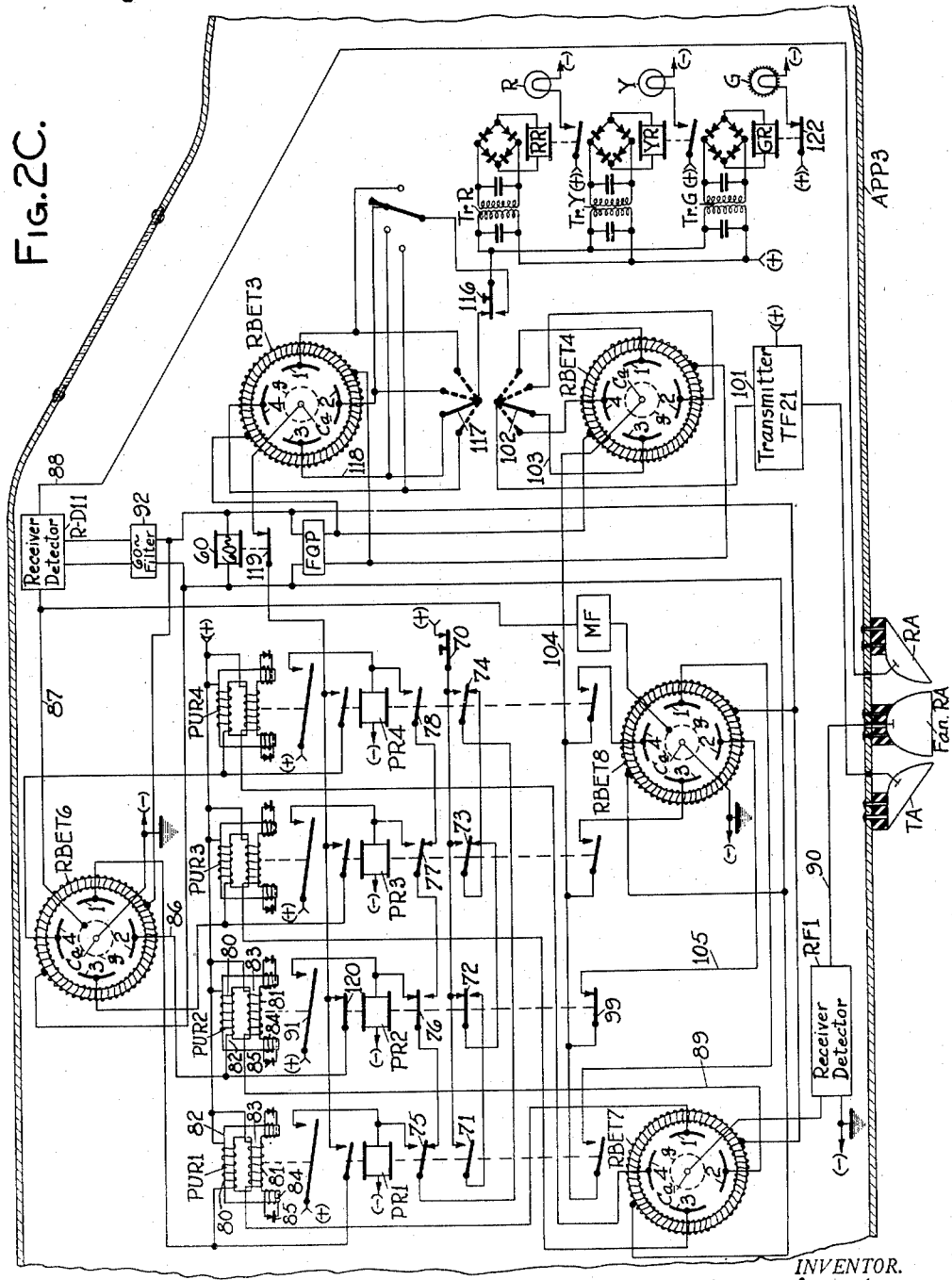

*Structure—Figs. 1A, 1B and 1C.*—The system illustrated in Figs. 1A-1C of the drawings is provided to indicate in the cab or cockpit of an airplane the conditions of traffic ahead of such airplane for the particular altitude at which such airplane is flying and to manifest at a ground location for that block section the fact that such airplane is flying in that block section and is flying at a particular altitude. In other words, in order to manifest traffic conditions in advance in the cab of an airplane flying at a particular altitude provision must be made to manifest the presence of all airplanes travelling in such and adjacent block sections and at such altitude. In order to manifest the presence of an airplane precisely within the limits of a particular block section on an air traffic route it is necessary that the beginning and end of such block section be rather definitely defined. In accordance with the present invention and particularly as illustrated in Figs. 1A, 1B and 1C (also Figs. 2A, 2B, 2C, 3A and 3B) it is proposed to manifest the starting point of a block section by the provision of a comparatively narrow radio beacon of the fan-marker type, such radio beacon being rather wide transversely of the air route but rather narrow longitudinally of the air route and to manifest the exit point of such block section by the reception of radio energy from the fan marker at the beginning of the next block section. It is further proposed to use distinctive space radiation energies in successive blocks repeated at intervals so that the reception of space radiation energy of a particular character is a clear manifestation of traffic conditions in advance for that block, such distinctive space radiation energies being transmitted only in blocks which are so far apart that the energy received from the nearest block transmitting energy of that character, namely, the block in which the airplane is travelling will dominate the energy of like character emitted from the next block in advance which emits energy of the same character.

Referring to Fig. 1A two block sections one extending from fix 1 to fix 2 and the second block section extending from fix 2 to fix 3 have been shown. In accordance with the specific embodiment of the invention shown in Figs. 1A-1C, it is proposed to use distinctive radio carrier frequencies for the various distinctive space radiation transmissions to define blocks and to transmit this space radiation energy in successive cycles of pulses wherein a particular pulse in a cycle characterized the particular altitude under consideration. It is further proposed to modulate the carrier frequency to manifest traffic conditions.

Referring to Fig. 1A the radio carrier frequencies for the three fan markers illustrated at fixes 1, 2 and 3 respectively are frequencies F1, F2 and F3, whereas the radio frequency transmitted from the fix in advance of such fix to an airplane flying in the block section in advance of each of these fixes have been designated F11, F12 and F13 (not shown) respectively. Similarly, the return space radiation energy that is transmitted from the airplane back to the next fix in the rear of that block have carrier frequencies of values F21, F22 and F23 respectively. In other words, carrier frequencies F1, F11 and F21 are used in the block section fix 1-fix 2, carrier frequencies F2, F12 and F22 are used in the block section extending from fix 2 to fix 3 and carrier frequencies F3, F13 (not shown) and F23 are used in block sections extending from fix 3 to fix 4 (not shown). After the fourth block (only partly shown) which employs frequencies F4 (not shown), F14 and F24 (not shown) these frequencies are repeated. Obviously, this repeat of frequencies may occur after any desired number of blocks.

In this connection, it may be pointed out that when an airplane has once entered a particular block section space radiation energy is transmitted from the ground at the exit end of such block section to the airplane modulated to a so-called "pick-up frequency" but not to characterize traffic conditions in advance for a particular altitude. This space radiation energy when received on the airplane has the modulation character defining traffic conditions then deleted therefrom after which it is, on the particular pulse time identifying the altitude at which the airplane is then flying, retransmitted at a different carrier frequency to the fix at the entrance end of that block section from whence this pulse is again transmitted to the fix at the exit end of such block section at which point the radio pulse is then modulated to characterize traffic conditions in advance. In this way the fact that the airplane is manifesting its presence is repeated back to the pilot of that airplane so that he is aware of the fact that he is properly protected against being struck by an airplane from the rear which is equipped with similar cab signalling apparatus. In other words, the reception of a signal on a particular airplane is a definite manifestation that that particular airplane is manifesting its presence at a particular altitude in a particular block section.

Referring now to Fig. 1B of the drawings it will be observed that the ground located apparatus for fix 2 has been illustrated conventionally in full. This ground apparatus includes suitable means for transmitting a synchronizing alternating current, say of 60 cycles, as well as for transmitting traffic conditions existing in advance for each altitude. In the particular embodiment of the invention illustrated, conditions of traffic at one fix are transmitted to the first and second fix in the rear through the medium of line wires 27 and 28 whereas the synchronizing frequency is transmitted over line wires 25 and 26.

The present invention, as above pointed out, contemplates transmitting distinctive altitude information by the time-of-impulse or synchronous method and for this reason rotating beam electron tubes RBET1 and RBET2 have been provided as shown in Fig. 1B of the drawings and rotating beam electron tubes RBET3 and RBET4 have been provided on the airplane as illustrated in Fig. 1C of the drawings. The rotating electron beams in all of these rotating beam tubes are kept in synchronism through the medium of the synchronizing frequency transmitted from fix to fix and from the various fixes to the various airplanes through suitable means including the transmission lines 25 and 26 and space radiation apparatus more specifically described hereinafter. As an example, these beams may rotate at a speed of 60 revolutions per second as will be the case if 60 cycle energy is used and these tubes are preferably of a construction such as more fully described in the prior application of Field and Wight, Ser. No. 599,328, filed June 14, 1945, now Pat. No. 2,448,487, dated August 31, 1948.

Figure 6:
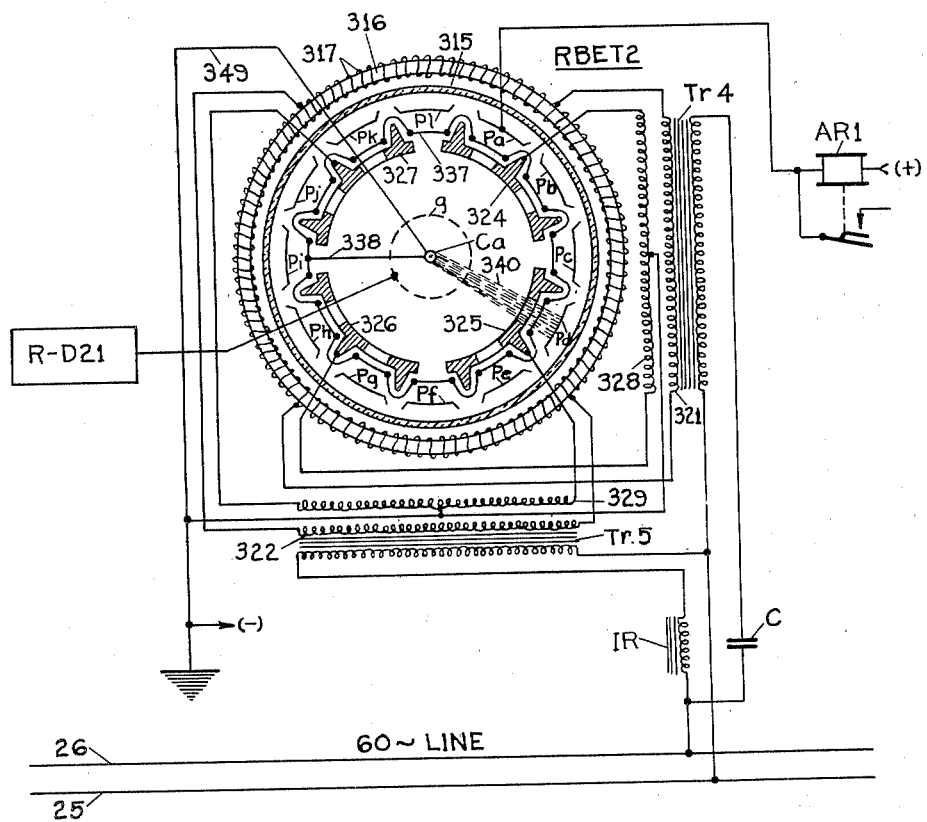
Fig. 6 illustrates a typical multiple anode tube as shown in Pat. No. 2,448,487, dated August 31, 1948, which tube is contemplated as employed as a part of this disclosure.

The various rotating beam electron tubes have been shown in their simplest form, certain connections thereto being abbreviated, but the complete connections are shown in Fig. 6 as made to a tube of the structure and type disclosed in the above noted Patent No. 2,448,487. Referring to this Fig. 6, it will be seen that the typical rotating electron beam tube RBET2 for example, comprises a cylindrical envelope 315, preferably constructed of glass, which is evacuated and contains the electron scanning apparatus. This glass envelope is surrounded by a laminated iron core 316 containing one or more windings 317, as the case may be, to produce a two-pole rotating magnetic field. Although this core 316 and 317 has been illustrated as constituting a field structure of the gramme-ring type, it may be, if desired, a toothed stator having inwardly directed magnetic teeth into which a two-pole two-phase lap winding may be contained. In order to produce the necessary rotating magnetic field for the field structure shown, a source of polyphase energy, conventionally illustrated as two-phase energy, is applied to the winding 317. Obviously, any multi-phase, such as three or six phase, winding and a corresponding phase source may be used, if desired.

The two-phase energy is illustrated as being derived from transformers Tr4 and Tr5 having their primary windings from an alternating current source, such as the line wires 25 and 26 constituting a 60 cycle line circuit. Suitable means is provided between the alternating current line and the primary windings of the transformers to provide a proper displacement in phase between the two transformers. This phase displacement is preferably obtained through the medium of a condenser C included in the circuit of the primary winding for the transformer Tr4, and a choke coil or inductive reactance IR included in the primary winding of the transformer Tr5. The condenser C and the inductive reactance IR have such capacity and inductance respectively that each causes a phase displacement of substantially 45°. It is readily understood that by connecting the output terminals of the first set of secondary windings to respectively opposite points on the winding 317 and by having these secondary outputs displaced by 90° with respect to each other a two-phase rotating magnetic field will be set up in the evacuated tube or envelope 315.

Within the evacuated tube 315 and arranged in the form of a cylinder are provided four suppression grid elements 324, 325, 326 and 327. The suppressor grid elements 324 and 326 are connected to the opposite ends of the added secondary winding of the transformer Tr4; whereas, the suppressor grid elements 325 and 327 are connected to opposite ends of the additional secondary winding of the transformer Tr5. Around the outside of the tube structure are the plates Pa, Pb, Pc, etc. each of which have considerable length and area. It will be seen that the various plates Pa, Pb, etc. are each located back of an opening or window in or between the suppressor grids 324—327. Between the plates Pa, Pb, etc. and the suppressor grid elements is another suppressor grid 337 which is directly connected to the cathode Ca. The cathode Ca is in turn surrounded by the control grid g which is connected externally to the controlling potential which is illustrated as being the receiver R—D21 by way of example. The suppressor grid 337 is used to suppress the effect of secondary emission from the plates or anodes Pa, Pb, etc. and its connection to the cathode is through the medium of conductor 338 in accordance with the usual practice.

It is believed that the above brief description of the tube structure will suffice, since further detailed description may be found in the patent above referred to.

In the specific embodiments of the invention illustrated it is assumed that airplanes will only fly at four different altitudes of 1000, 2000, 3000 and 4000 feet respectively, although many more altitudes may be resorted to, if desired. The presence of an airplane at a particular altitude in a particular block section is made manifest through the medium of four approach relays AR1, AR2, AR3 and AR4 at the exit fix of such block, these relays having only been illustrated for the four altitudes at fix 2 (Fig. 1B). These various approach relays AR control various home relays HR1, HR2, HR3 or HR4 and various distance relays DR1, DR2, DR3 and DR4 where the numeral suffix identifies the particular altitude with which such approach relay, home relay or distant relay is associated. Each fix is provided with suitable antennas for transmitting concentrated beam space radiation energy in various directions. For instance, a fan marker has been shown at each of the fixes 1, 2 and 3 and the antennas thereof have been designated TAF1, TAF2 and TAF3 respectively, these antennas being energized by radio transmitters TF1, TF2 and TF3, respectively. Similarly, each block is provided with a transmitting antenna TA and with a receiving antenna RA. The transmitting antenna is associated with the exit fix whereas the receiving antenna is associated with the entrance fix. The transmitting antennas for fixes 1, 2 and 3 respectively have been designated TAF14, TAF11, TAF12 whereas the receiving antennas have been designated RAF21, RAF22 and RAF23. These transmitting antennas are respectively connected to transmitters TF14, TF11 and TF12 (some of which have been omitted from the drawing) whereas the receiving antennas are connected to radio receivers and detectors R—D21, R—D22 and R—D23 respectively. Each of these radio transmitters, such as radio transmitter TF11 for fix 2, is provided with input tone generators for modulating the radio carrier frequency, these tone generators having been designated TG—PU, TG—R, TG—Y and TG—G. It may be pointed out that these modulating frequencies characterize respectively a pick-up modulation PU, an R or danger modulation, a Y or caution modulation, and a G or clear modulation. In addition to one of these modulating frequencies the carrier frequency is also modulated to the synchronizing frequency which is assumed to be 60 cycles in the particular embodiments of the invention illustrated, as conventionally shown by wires 32 and 34 (Fig. 1B).

Referring now more particularly to the airplane carried apparatus illustrated in Fig. 1C of the drawings it will be observed that three separate antennas TA, FanRA and RA are fastened to the lower part of the airplane AP2 (see Figs. 1C and 1A), the antennas TA and RA being employed for respectively transmitting and receiving space radiation energy for traffic manifestation purposes whereas the antenna FanRA is employed to receive space radiation energy from the fan marker at the entrance end to a particular block section to manifest entrance of the airplane into a new block. Since different radio carrier frequencies are employed in the system shown in Figs. 1A, 1B and 1C for each of four blocks in succession along the air route each of these antennas must be capable of transmitting or receiving, as the case may be, space radiation energy of four different frequencies. It should of course be understood that the invention is not limited to the employment of repeating of specific carrier frequencies at any specific number of fixes along the route but for convenience the invention has been disclosed as having these frequencies repeated for every fifth fix along the route. Also, if desired, instead of using different carrier frequencies for like antennas in successive blocks, like carrier frequencies distinctively modulated may be employed. Since four different kinds of carrier frequencies are assumed to be employed it will be observed that the fan marker receiving antenna FanRA is directly connected to four different receivers RF1, RF2, RF3 and RF4 whereas the radio receiving antenna RA is connected to receivers and detectors R—D11, R—D12, R—D13 and R—D14. The received energy in each case flows to the particular receiver or receiver-detector which is tuned to agree with the space radiation energy received. Similarly, the transmitting antenna TA has energy supplied thereto from any one of four different radio transmitters TF21, TF22, TF23 and TF24.

As shown the output energies from the radio receivers RF1, RF2, RF3 and RF4 are supplied to the upper windings of the repeater relays PR11, PR12, PR13 and PR14. Obviously only one of these receivers is active at any one time. The flow of this energy is, however, dependent upon the associated pick-up relay PUR11, PUR12, PUR13 or PUR14 being in its picked-up condition. These pick-up relays PUR11, PUR12, PUR13 and PUR14 are energized from tuned transformers Tr11, Tr12, Tr13 and Tr14, respectively, which transformers receive their energies from the receiver-detectors R—D11, R—D12, R—D13 and R—D14 respectively. It will be observed that each of these receivers R—D11, R—D12, R—D13 and R—D14 has associated therewith a 60 cycle filtering unit 60F11, 60F12, 60F13 and 60F14 respectively and that the energy from any one of these filters may flow to the 60 cycle relay 60 and also to the windings 23 and 24 of the rotating beam electron tubes RBET3 and RBET4 respectively. Corresponding windings of the rotating beam tube RBET1 and RBET2 (Fig. 1B) have been designated 21 and 22 respectively. It will be observed that the output energy from the rotating beam electron tube RBET3 may activate the grid $g$ of the rotating beam electron tube RBET4 through the medium of a circuit including a modulation filter MF. This filter is employed to transmit pulses, one per cycle of synchronizing energy, to the grid of the rotating beam electron tube RBET4. These pulses have the particular modulating frequency, which was originally transmitted by such pulses, removed therefrom, so that as these pulses are re-transmitted to the ground location they no longer manifest traffic conditions, but merely manifest the altitude by the time of their occurrance. In this connection, it should be understood that the modulation filter MF (Fig. 1C) includes suitable voltage reversing means such as disclosed in said prior application of Field and Wight, Ser. No. 599,328 so that positive not negative impulses are applied to the grid $g$ of tube RBET4. It will also be seen that the output energy from the rotating beam electron tube RBET3 may pass from one of the plates 1, 2, 3 or 4 thereof depending upon the position assumed by the altimeter controlled contact 33 to one of the tuned transformers TrR, TrY or TrG depending upon the modulating frequency modulating that pulse and that this energy may be rectified through the medium of the full-wave rectifiers illustrated from whence it may pass to the particular danger relay RR, caution relay YR, or clear relay GR, respectively, as the case may be. These relays RR, YR and GR control red, yellow and green indicating lamps R, Y and G respectively.

*Operation—Figs. 1A, 1B and 1C.*—Referring to Fig. 1A let us assume that the airplane AP2 has not yet passed the fan marker antenna TAF1 emitting a radio carrier frequency F1 and located at the entrance to the block section fix 1—fix 2 is flying at an altitude of 3000 feet. Let us now assume that this airplane AP2 has advanced to the point where it receives radio energy of carrier frequency F1 and that it also receives radio energy of carrier frequency F11 modulated at modulation frequency PU from the radio transmitting antenna TAF11 located at fix 2. Referring now to Fig. 1C of the drawings the space radiation energy received by the antenna RA may flow over wire 35 to the radio receiver and detector R—D11 from whence a modulating frequency conveniently called the pick-up modulation may flow through the tuned transformer Tr11 and may then flow through the associated full-wave rectifier to the pick-up relay PUR11 as direct current. This will cause the relay PUR11 to pick up and close its contact 36. With contact 36 closed the fan marker radio energy received by the fan marker receiver RF1 may flow from the terminal plus (+), receiver RF1, the upper winding of repeater relay PR11 through contact 36 of relay PUR11 to the other terminal (—) of this source of current supplying plate energy to the receiver RF1. The flow of this energy causes the repeater relay PR11 to pick up and stick up and in so doing allows a pulse of current to be generated by the radio transmitter TF21 of carrier frequency F21 on the third pulse of the cycle of the rotating beam electron tube RBET4. The circuit for this energy may be traced from the terminal (+) of a suitable source of current, wire 37, radio transmitter TF21, wire 38, front contact 39 of the repeater relay PR11, wire 40, altimeter controlled contact 41 assuming the 3000 foot position, plate 3 of the rotating beam electron tube RBET4, through the electron beam thereof to the cathode Ca of this electron tube RBET4 to the other terminal (—) of said source of current. The grid g of this rotating electron tube RBET4 is active at this time (third impulse time) even though approach relay AR3 (Fig. 1B) is still down and transmits a pick-up pulse PU during this third impulse time of a beam rotating cycle of the rotating beam electron tube RBET1. The flow of this impulse of current during the third pulse of the cycle defined by the rotating beam electron tube RBET4 to the transmitter TF21 (Fig. 1C) will cause a pulse of space radiation energy to be transmitted through the medium of the transmitting antenna TA on the airplane to the ground located receiving antenna RAF21 (Figs. 1A and 1B), this space radiation impulse being a radio frequency F21. This energy is then received and detected by the radio receiver-detector R—D21 from whence it may flow through wire 42 to the grid g of the rotating beam electron tube RBET2. This will of course cause activation of this grid g of this tube at the time when its electron beam wipes past the plate 3. Current will therefore flow at this instant from the terminal (+) of a suitable source of current, wire 44, winding of the approach relay AR3, wire 45, plate 3 of the rotating beam electron tube RBET2, through the electron beam of this tube, to the cathode Ca to the other terminal (—) of this source of current. It is of course understood that the approach relay AR3 has not yet picked up and that the energy that was transmitted to the airplane receiver antenna RA and which picked up the pick-up relay PUR11 could not have been derived from the electron tube RBET2 (Fig. 1B) and that this energy was instead derived from the electron tube RBET1. This current flowed through a circuit which may be traced from the terminal (+) of a suitable source of current, radio transmitter TF11, the pick-up portion PU of the tone generator TG—PU, wire 47, back contract 48 of the approach relay AR3, wire 49, plate 3 of the rotating beam electron tube RBET1, to the cathode Ca of this tube to the other terminal (—) of this source of current. In other words, so long as the approach relay AR3 remains deenergized the radio transmitter TF11 receives its energy from the rotating beam electron tube RBET1 during the third pulse of a cycle of radio pulse communication but that this energy is derived from the rotating beam electron tube RBET2 as soon as the approach relay AR3 picks up. In other words, during the first one or more cycles of spaced radiation impulse transmission on the third pulse time of such transmission is derived from the rotating beam electron tube RBET1 and is transmitted to the airplane AP2 (Fig. 1C) because this airplane is flying the 3000 foot altitude. This energy is modulated to pick-up modulation frequency PU. This energy is then re-transmitted to the grid g of the electron tube RBET2 (Fig. 1B) to cause it to try to pick up the approach relay AR3. So long as this approach relay AR3 does not pick up the electron tube RBET1 transmits newly originated radio energy up to the airplane which is then repeated down to the ground. However, as soon as the approach relay AR3 picks up the rotating beam electron tube RBET1 no longer serves a useful purpose insofar as pulse 3 of the impulse cycle is concerned but may still perform a useful function insofar as pulses 1, 2 and 4 of this impulse cycle is concerned. Also, this energy is modulated to pick-up frequency so long as approach relay AR3 remains deenergized but when relay AR3 picks up it is modulated to a clear, caution or danger frequency G, Y or R respectively dependent on traffic conditions in advance.

It should be understood that relay PR11 (Fig. 1C) if once picked up will be held energized by a holding circuit which may be traced from the terminal (+) of a suitable source of current, push button contact 70, front contact 71 of relay PR11, back contact 72 of relay PR12, back contact 73 of relay PR13, back contact 74 of relay PR14, stick contact 75 of relay PR11, lower winding of this relay PR11 to the other terminal (—) of this source. The relays PR12, PR13 and PR14 may be stuck up by similar holding circuits including stick contacts 76, 77 and 78, respectively. The subsequent picking up of any one of the relays PR12, PR13 or PR14 will result in the dropping of relay PR11 for obvious reasons.

Let us now assume that the approach relay AR3 has received a sufficient number of impulses to have picked up and has opened its back contact 48 and closed its front contact 50. These contacts are preferably adjusted make-before-break as conventionally illustrated by the letters MB. Energy may now flow through the electron tube RBET2 from the terminal (+) of a suitable source of current, to radio transmitter TF11, tone generating element G of the tone generator TG, wire 51, front contact 52 of the home relay HR3, front contact 53 of the distant relay DR3 (traffic conditions in advance being assumed to be clear), front contact 50 of the approach relay AR3, wire 45, plate 3 of the tube RBET2, the rotating electron beam thereof to the cathode Ca and then to the terminal (—) of this same source of current. The flow of current in this circuit causes the radio transmitter TF11 to transmit space radiation energy of carrier frequency F11 modulated to both frequency G and 60 cycles the first of which signifies clear traffic conditions. The 60 cycle modulation is brought about through the wires 32 and 34 connecting transmitter TF11 to the transmision line 25—26. As this space radiation energy is received by the receiving antenna RA carried by the airplane (Fig. 1C) this energy may flow over wire 35 to the receiver-detector R—D11 and from whence potential of current modulated at frequency G may be applied through front contact 55 of repeater relay RP11, wire 56, front contact 57 of the relay 60, wire 58 to the grid g of the rotating beam electron tube RBET3 at the instant its electron beam wipes over plate 3 of this tube. With the grid g of this tube RBET3 now activated current may flow from the terminal (+) of a suitable source of current, primary winding of the tuned transformer TrG, push button contact 29, altimeter controlled contact 33 assuming the 3000 foot altitude position, plate 3, electron beam of tube RBET3 to the cathode Ca of this same tube to the other terminal (—) of this same source of current. This current is of course modulated at the clear, green or G frequency and flows freely through the transformer TrG, and causes the signal relay GR to pick up. The current flowing in the relay GR having in the meantime been rectified by the associated full-wave rectifier.

Not only does this pulse flow to the transformer TrG to in turn cause the energization of the clear relay GR but a pulse having this modulation removed therefrom by the modulation detector or filter MF will flow, after it has been pole changed by suitable means not shown, to the grid g of the transmitting rotating beam electron tube RBET4. This will in turn cause an answer-back space radiation impulse to be transmitted to fix 1 (Fig. 1B) by transmitter TF21 (Fig. 1C) and its associated antenna TA. It is thus seen that each impulse of space radiation energy that is transmitted from the exit end of a block section to an airplane is used not only for producing the proper signal indication in the cab of the airplane but that this impulse, after having the modulation filtered therefrom, is again transmitted to the ground location to trigger off, so to speak, the next radio impulse which is to be transmitted to the airplane after it has first been modulated to characterize traffic conditions then existing for that altitude for that block.

In this connection it should be observed that the home relay HR having a suffix corresponding to the altitude under consideration, is energized so long as the approach relay for that altitude at the next fix in advance assumes its deenergized position but that the distant relay DR, having a suffix corresponding to that altitude, is only energized if the approach relay for that altitude at both the first fix and the second fix in advance thereof assume their deenergized position. The circuit for the home relay HR1 for fix 2 may be traced in Fig. 1B of the drawings from the terminal (+) of a suitable source of current, back contact 62 of approach relay AR1 at fix 3, wire 27, winding of the relay HR1 at fix 2 to the other terminal (—) of this same source of current. Also, the energizing circuit for the distant relay DR1 for fix 1 may be traced from the terminal (+) of this same battery through this same back contact 62 of relay AR1 for fix 3, wire 27, back contact 63 of relay AR1 for fix 2, wire 28, winding of the relay DR1 for fix 1, to the other terminal (—) of this same source of current. It is thus seen that a home relay HR for any fix is energized provided the approach relay for the altitude at the next fix in advance is deenergized and that the distant relay DR for any particular fix and altitude is energized only if the approach relays AR for both that altitude of the next two fixes in advance are deenergized. The relays AR2, AR3 and AR4 are provided with similar control circuits.

Let us now assume that the airplane AP2 (Fig. 1A) proceeds through the block section extending from fix 1 to fix 2, and passes over fix 2. As this airplane AP2 passes over fix 2 space radiation energy of carrier frequency F2 is received by the fan marker antenna FanRA at the same instant when the radio antenna RA on this airplane AP2 receives radio energy of carrier frequency F12. For reasons heretofore described the reception of these radio energies of frequencies F2 and F12 will cause the pick-up relay PUR12 and the repeater relay PR12 (Fig. 1C) to assume their energized positions. The picking up of relay PR12 will by the momentary opening of back contact 72 interrupt the holding or stick circuit for the repeater relay PR11 to thereby cause it to assume its deenergized position and to thereby discontinue the emission of space radiation energy of frequency F21 by the radio transmitting antenna TA carried by the airplane AP2. Obviously, the picking up of this repeater relay PR12 causes space radiation energy of carrier frequency F22 to be transmitted by this antenna TA which eventually results in the transmission of space radiation energy of carrier frequency F12 from antenna TAF12 of radio fix 3 to the airplane AP2 which is modulated to manifest traffic conditions existing in advance for that altitude.

Referring to Fig. 1C, if for any reason the pilot wishes to drop all of the relays PR11, PR12, PR13 and PR14 to their deenergized position because, for instance, he is shifting from one route to another and wishes to have a new relay to pick up or the same relay to again pick up, he may depress the push button 70. This opens the stick circuit for any one of the relays PR11—PR14 that may then be assuming it energized position. As already pointed out if a second relay PR is picked up when another one of these relays PR is in an energized condition this picking up of a second relay PR causes deenergization of the formerly energized relay. Obviously, when traffic conditions in advance for the altitude at which an airplane is flying change the carrier frequency will immediately be modulated at the new rate defining the new traffic condition.

There may be times when a pilot desires to ascend or descend to a different altitude. In order for him to observe traffic conditions in advance in an altitude different from the one in which the airplane is then flying, that is, if the pilot wants to look into a different altitude, the pilot may set his selecting hand switch 65 (Fig. 1C) to the position corresponding to the altitude into which he wishes to look to observe traffic conditions in advance. For instance, under the conditions illustrated in the Fig. 1C the airplane is assumed to be flying at an altitude 3000 because the two altimeter controlled switches 33 and 41 assume the altitude 3 position. If now the pilot wishes to look into altitude 2 he may operate his hand switch 65 to the second position from the right and may then depress the push button 29. This will cause the cab signals to indicate traffic conditions in altitude 2 whereas the presence of the airplane in altitude 3 is manifested on the ground. The latter conclusion is correct because the grid G of the rotating beam electron tube RBET4 is still connected to plate 3 of tube RBET3 through the medium of the modulation filter MF and the altimeter switch 33, and furthermore the altimeter switch 41 still assumes its altitude 3 position and transmits radio energy through the medium of the transmitter antenna TA to the ground located apparatus having a time-of-impulse character which manifests that the airplane is flying in altitude 3. In this connection it should be understood that if a pilot upon looking into another altitude observes either clear (green), caution (yellow) or danger (red) space radiation energy emitted he is informed that the same block in which he is flying is occupied by another airplane flying at the altitude into which he is looking. Under this condition it is of course unsafe for him to enter such other altitude. If, however, the pilot receives neither a clear, caution or danger indication he is reasonably assured that the same block at such other altitude is not occupied and that he may enter such other altitude. In this connection a fourth, or approach indication light similar to indicating lights G, Y and R may be provided, this light being controlled through a tuned unit tuned to the pick-up frequency PU. This fourth light could then be used only when the push button 29 is depressed and could be used to indicate that the same block of the altitude he is looking into is vacant.

*Modification—Fig. 1D.*—Instead of having space radiation energy transmitted rearwardly downwardly from an airplane, as illustrated in Figs. 1A and 1C of the drawings, this radio energy may be transmitted forwardly and downwardly as illustrated in Fig. 1D of the drawings. By resorting to this construction the radio energy when transmitted from the airplane to the ground equipment reaches the next fix in advance of the airplane and for this reason it is unnecessary to transmit the information transmitted from the airplane to the ground from one fix to another in the direction of airplane travel, but in this case this energy which also manifests block-altitude occupancy must be transmitted rearwardly from the exit fix to the entrance fix for that block. It would therefore seem that this modified construction shown in Fig. 1D of the drawings is neither inferior nor superior to that of the construction shown in Fig. 1A of the drawings from a line wire standpoint. There may, however, be other reasons for preferring one form over the other.

*Structure—Figs. 2A, 2B and 2C.*—Referring to Fig. 2B of the drawings it should be understood that the home relays HR and distant relays DR are controlled in exactly the same manner as correspondingly designated relays illustrated and described in connection with Fig. 1B of the drawings are controlled. Referring to Fig. 2A of the drawings it will be observed that the structure shown in Fig. 2A is the same as that illustrated in Fig. 1A except that the two transmitting antennas TAF1 and TAF11 at each of the fixes transmit the same two frequencies F1 and F11 respectively whereas in the Fig. 1A structure the fan marker antennas at four successive fixes each transmit a different frequency after which these transmitting frequencies are repeated in sequence for the next four fixes, and so on. Similarly, in the Fig. 2A structure the receiving antennas RAF21 and their associated receivers located at each of fixes 1, 2 and 3 are constructed to receive the same carrier frequency F21 whereas in the Fig. 1A structure each four successive receivers will be tuned to a different carrier frequency. The specific structure of the ground located apparatus is also different as is evident from comparing Fig. 2B with Fig. 1B. In Fig. 2B of the drawings the same carrier frequencies are used in successive blocks but these successive blocks transmit their space radiation energies at different time-of-impulse periods. This is evident from the fact that anodes 2 of tubes RBET5 and RBET9 are used in block fix 1—fix 2 whereas anodes 3 are used in block fix 2—fix 3. This is done in order to be sure that an airplane flying in a particular block will not receive energy intended for an adjacent block.

Again referring to Fig. 2B of the drawings additional rotating beam electron tubes RBET5 and RBET9 are employed the electron beams of which rotate preferably at a speed of 60 revolutions per second. These electron tubes RBET5 and RBET9 are connected in tandem or series with the two electron beam tubes RBET2 and RBET1, respectively. In this connection it should be observed that the electron beams of the tubes RBET1 and RBET2 are rotated at four times the frequency of rotation of the electron beams for tubes RBET5 and RBET9. This is accomplished by employing a frequency quadruplicator FQ. In this connection it is desired to point out that the rotating beam electron tubes RBET5 and RBET9 characterize the impulses to identify the particular block for which the emitted space radiation energy is intended, whereas the electron beam tubes RBET1 and RBET2 identify the particular altitude for the particular block under consideration. These impulses of space radiation energy are further characterized by having their carrier frequencies modulated to manifest traffic conditions in advance for that block-altitude and the circuits for accomplishing this are substantially the same as those already described in connection with Fig. 1B and will for convenience have the devices and contacts thereof identified by like reference characters.

Comparing now the airplane carried apparatus illustrated in Fig. 2C with that illustrated in Fig. 1C it will be observed that the apparatus on the extreme right-hand side of the drawings is exactly the same as that of Fig. 1C but that the apparatus in the left-hand portion of Fig. 2C is somewhat different. The differeneces between the two apparatuses are the result of providing means for identifying successive blocks by the time-of-impulse method as distinguished from the frequency modulating method employed in the Fig. 1C structure. Referring to Fig. 2C it will be observed that the airplane carried transmitter TF21 transmits only frequency F21 whereas the airplane carried transmitters TF21, TF22, TF23 and TF24 of Fig. 1C transmit frequencies F21, F22, F23 and F24, respectively. Also, whereas in the Fig. 2C structure, the radio receiver R—D11 connected to the antenna RA by a wire 88 is capable of receiving only frequency F11 while corresponding receivers R—D11, R—D12, R—D13 and R—D14 in the Fig. 1C structure are capable of receiving distinctively carrier frequencies F11, F12, F13 and F14 respectively. Similarly, the fan space radiation receiving antenna FanRA illustrated in Fig. 2C of the drawings received energy only for one receiver capable of receiving frequency F1 whereas the corresponding antenna of the Fig. 1C structure is connected to four radio receivers RF1, RF2, RF3 and RF4.

As already pointed out the repeater relays PR11, PR12, PR13 and PR14 of Fig. 1C are picked up respectively only if radio energies of proper frequencies are received by both of two receiving antennas FanRA and RA whereas in the Fig. 2C structure radio energies must be received on the same and proper time-of-impulse period by each of the receiving antennas FanRA and RA. As already described in connection with the Fig. 1C structure these space radiation energies for picking up one of the repeater relays PR11, PR12, etc. are detected by suitable tuning and filtering apparatus whereas in the Fig. 2C structure these energies are detected through the medium of both tuned circuits and rotating beam electron tubes RBET6 and RBET7 and associated discriminating pickup relays PUR1, PUR2, PUR3 and PUR4. These relays PUR1, PUR2, PUR3 and PUR4 control the repeater relays PR1, PR2, PR3 and PR4, respectively. These rotating beam electron tubes RBET6 and RBET7 have their rotating beams rotate at the comparatively low speed of say 60 revolutions per second as is also true of the rotating beam electron tube RBET8 whereas the rotating beam electron tubes RBET3 and RBET4 have their electron beams rotating at four times this speed through the medium of a frequency quadruplicator FQP. In all other respects, the apparatus illustrated in Figs. 2A, 2B and 2C of the drawings is the same as that illustrated in Figs. 1A, 1B and 1C of the drawings. The operating results of the apparatus illustrated in Figs. 2A, 2B and 2C of the drawings are substantially the same as those accomplished by the employment of the apparatus shown in Figs. 1A, 1B and 1C of the drawings. The operation itself is, however, somewhat different and for this reason the operation of the apparatus illustrated in Figs. 2A, 2B and 2C of the drawings will be presently considered.

*Operation—Figs. 2A, 2B and 2C.*—Referring to Fig. 2A of the drawings let us assume that the airplane APP3 (Figs. 2A and 2C) flying at altitude 3000 feet has not yet passed the fix 1 and that for this reason this airplane APP3 is still in communicating relationship with the transmitter TAF11 of fix 1. Let us now assume that this airplane APP3 passes over fix 1 and in so doing receives fan space radiation energy from the fan transmitting antenna TAF1 of this fix. It of course also receives radio energy from the transmitting antenna TAF11 at fix 2. As shown in Fig. 2A the antenna TAF1 of fix 1 emits space radiation energy during all of impulse periods 5—8 as does also the antenna TAF11 at fix 2 but only the seventh impulse time will reach the signal transformers TrG, TrY or TrR on the airplane APP3 (Fig. 2C) flying at altitude 3. This simultaneous reception of these energies by the receiving antennas FanRA and RA (Fig. 2C) causes impulse to be applied to the windings 80 and 81 on core portions 82 and 83 respectively of the relay PUR2 (Fig. 2C) intermittently. These windings 80 and 81 are so poled on their respective core portions 82 and 83 that the simultaneous fluxes produced by these windings act accumulatively upon the armature of this relay PUR2. It should be observed that if the impulses of currents applied to windings 80 and 81 are not simultaneous they will not produce any effect because the core for the other coil in each case serves as a magnetic shunt for the armature. Although these pulses of current are extremely short the bucking coils 84 on the poles of this relay PUR2 have rectifiers 85 included therein so that these coils 84 do not oppose the building up of flux therein but they do oppose the dying down of flux therein. In other words, these bucking coils 84 serve as energy storing devices to hold the relay armature attracted between successive pulses of current applied to the relay. The upper winding 80 of this relay PUR2 is supplied by energy through a circuit beginning at the terminal (+) of a suitable source of direct current, winding 80 of relay PUR2, wire 86, plate 2 of rotating beam electron tube RBET6, through the rotating electron beam of this tube to the cathode Ca thereof to the (—) terminal of this source, which is also grounded. This rotating beam electron tube RBET6 is activated at this instant because energy from the receiver R—D11 may flow to the grid g of this tube RBET6 through the medium of wire 87. The receiver R—D11 is energized at this instant through the medium of wire 88 connected to the antenna RA. Likewise, the lower coil 81 of this relay PUR2 is energized at this same instant through a circuit which may be traced from the same terminal (+) of a suitable source of direct current, winding 81 of the relay PUR2, wire 89, plate 2 of rotating beam electron tube RBET7, the rotating beam and the cathode Ca of this tube, the receiver-detector RF1 to the other terminal (—) of this same source of current, which is also grounded. This radio receiver RF1 is at this instant activated through the medium of wire 90 by energy received by the antenna FanRA. This simultaneous reception of short pulses, one for each cycle of rotation of the electron beams of these rotating beam electron tubes RBET6 and RBET7, causes this relay PUR2 to pick up and close its front contact 91. The closure of this front contact 91 completes a pick-up circuit for the repeater relay PR2 readily traced in the drawing. With this relay PR2 once picked up it drops the relay PR1 which was presumed up and it is then stuck up through a stick circuit which may be traced from the terminal (+) of a suitable source of current, push button contact 70, front contact 72 of relay PR2, back contact 73 of relay PR3, back contact 74 of relay PR4, back contact 75 of relay PR1, stick contact 76 of relay PR2, through the winding of this relay to the other terminal (—) of this source of current. With this relay PR2 once stuck up through the holding circuit just traced it will remain up until another relay PR is picked up or until the push button contact 70 has been manually opened.

Let us now observe by what means the two space radiation energies transmitted by transmitting antennas TAF1 of Fix 1 and TAF11 of fix 2 (Figs. 2A and 2B) have been created. Referring to Fig. 2B the radio transmitter T1 for fix 1 is rendered active during the time-of-impulse periods 5 to 8 inclusive, that is, during the time the electron beam of tube RBET9 wipes over plate 2 thereof. This is true because the block extending from fix 1 to fix 2 has assigned thereto all of the time-of-impulse periods 5 to 8 inclusive of the sixteen periods of a complete cycle and since these four impulse periods have been assigned to altitudes 1, 2, 3 and 4 it is readily seen that the transmitted energy must be such as to satisfy all four of these altitudes. These time-of-impulse periods are determined by the rotating beam electron tube RBET9 (Fig. 2B). The impulse transmitted by antenna TAF11 of fix 2 is due to the fact that the plate 2 of this tube RBET9 is connected to the cathode Ca of the tube RBET1 and therefore any one or more of the four impulses created by the tube RBET1 during the second revolution of its electron beam during a particular impulse cycle may be passed depending upon the particular number of altitudes that are occupied. In other words there will be as many of these four impulses passed as there are deenergized relays AR for fix 2 (Fig. 2B) and they will be transmitted through the medium of the transmitter TF11 and antenna TAF11 of fix 2. For the altitude 3 under consideration the circuit for energizing the transmitter TF11 of fix 2 (Fig. 2B) may be traced from the terminal (+) of a suitable source of direct current, suitable apparatus in this transmitter TF11, the tuning portion PU of the tone generator TG, wire 94, back contact 95 of the relay AR3, wire 96, plate 3 of the rotating beam electron tube RBET1, the rotating beam and cathode Ca of this tube, wire 97, plate 2 of the rotating beam electron tube RBET9, through the electron beam to the cathode Ca of this tube, and to the other and grounded terminal (—) of this source of current. Insofar as the circuit just traced is concerned it is readily seen that the space radiation energy transmitted by the antenna TAF11 of fix 2 will be transmitted during the seventh pulse of a 16 pulse cycle. During all of the pulse times 5 to 8 inclusive of this cycle current may flow from the terminal (+) through suitable apparatus of the transmitter T1 of fix 1, wire 98, plate 2 of rotating beam electron tube RBET9, through the electron beam of this tube and the cathode Ca thereof to the other terminal (—) of this source.

It is thus seen that the transmitting antenna TAF1 for fix 1 (Fig. 2B) and the antenna TAF11 for fix 2 transmit space radiation energies during the seventh (four plus three) impulse of this 16 impulse cycle as the result of which the relay PUR2 (Fig. 2C) may be picked up in a manner as already described. If other AR relays (Fig. 2B) than the relay AR3 are in their de-energized condition other pulses such as the fifth, sixth or eighth pulse time of the 16 impulse time cycle may be transmitted through plates 1, 2 or 4 of the tube RBET1 and these will also reach the relay PUR2 on the airplane because the electron beam of the tube RBET6 (Fig. 2C) is wiping over the plate 2 of this tube during all of the time-of-impulse periods 5 to 8 inclusive. None of the relays AR1, AR2, AR3 or AR4 will, up to this time under the conditions assumed, have any current applied to their energizing windings because no energy has thus far been received by the receiving antenna RAF21 of fix 1 (Fig. 2B).

Let us now observe how space radiation energy is transmitted from the airplane to this receiving antenna RAF21 of fix 1. Referring to Fig. 2C of the drawings since repeater relay PR2 has now been picked up and is being held up through a holding circuit heretofore traced, its closed front contact 99 closes the following circuit during the seventh time-of-impulse period of the impulse cycle: beginning at the terminal (+) of a suitable source of direct current, suitable apparatus in the transmitter TF21, wire 101, altimeter operated switch 102 assuming the 3000 foot altitude position, wire 103, plate 3 of the rotating beam electron tube RBET4, the electron beam of this tube rotating four times as fast as the electron beam of tube RBET8, the cathode Ca of this tube, wire 104, front contact 99 of the relay PR2, wire 105, plate 2 of the rotating beam electron tube RBET8, the electron beam and the cathode Ca of this tube, to the other grounded terminal (—) of this source of current. The electron beam of tube RBET8 rotates at a slow speed whereas the electron beam of the tube RBET4 rotates at four times this speed (see the frequency quadruplicator FQP) and since the relay PR2 determines through the medium of tube RBET8 that impulses may only flow during the second revolution of the beam of the tube RBET4 and the tube RBET4 determines that such impulse may only flow during the third impulse time of a revolution of the electron beam of tube RBET4, it becomes manifest that an electron impulse can only flow during the seventh time-of-impulse period of the cycle. This momentary flow of current through the medium of transmitter TF21 and antenna TA (Fig. 2C) causes space radiation energy to be transmitted to the ground located receiver RAF21 of fix 1 (Fig. 2A) and this energy flows only during the seventh impulse time of an impulse cycle.

Referring now to Fig. 2B this energy flowing during the seventh impulse period of the multiple impulse cycle causes space radiation energy to be received and detected by the receiver-detector R—D21 of fix 1 from whence this impulse flows to the grid g of the rotating beam electron tube RBET5 to activate the same. This causes current to flow through the following circuit during the seventh impulse period of a 16 impulse cycle: starting at the terminal (+), winding of the relay AR3, wire 107, plate 3 of the rotating beam electron tube RBET2, the electron beam electron Ca of this tube, wire 108, plate 2 of rotating beam electron tube RBET5, the electron beam and cathode Ca of this tube, to the other and grounded terminal (—) of this source. The first impulse through the circuit just traced will probably not be of sufficient duration to pick up the relay AR3 but since these impulses are repeated one impulse during each impulse cycle the relay AR3 will eventually pick up and will thereafter be held up so long as these impulses continue. It should be understood that these relays AR are provided with suitable accumulator means whereby energy may be stored beyond the time between successive impulse. A condenser could, for instance, be used. As soon as the approach relay AR3 picks up its back contact 95 is open so that no longer energy modulated at the pick-up frequency will be transmitted to the airplane but instead radio energy will be transmitted to the airplane which is modulated to characterize traffic conditions then existing in advance. Under the conditions illustrated traffic conditions in advance are clear because the distant relay DR3 and the home relay HR3 (Fig. 2B) both assume their energized position. Current may therefore flow from the terminal (+) of a suitable source of direct current, through suitable apparatus in the radio transmitter TF11, the tuning unit G of the tone generating unit TG for fix 2, wire 110, front contacts 111, 112 and 113 of the relays HR3, DR3 and AR3 respectively, wire 107, plate 3 of rotating beam electron tube RBET2, the electron beam and the cathode Ca of this tube, wire 108, plate 2 of rotating beam electron tube RBET5, the electron beam and the cathode Ca of this tube, to the other grounded terminal (—) of this same source of current. Space radiation energy is therefore transmitted through the medium of transmitter TF11 and antenna TAF11 for fix 2 during the seventh impulse of a 16 impulse cycle. This impulse is modulated to manifest clear traffic conditions in advance for altitude 3000 of the block extending from fix 1 to fix 2. This space radiation energy is received by the receiving antenna RA carried by the airplane APP3 (Fig. 2C) from whence it may flow through wire 88 to the receiver-detector R—D11, from whence a rectified impulse flows over wire 87 to the grid g of the rotating beam electron tube RBET6.

This space radiation energy has of course also superimposed thereon a 60 cycle current which is filtered out by the filter 92 and holds the relay 60 energized. With the grid g of the tube RBET6 now activated during each seventh impulse by energy modulated to manifest clear traffic conditions in advance energy may now flow through the following circuit for energizing the transformer TrG (Fig. 2C): starting at the terminal (+) the primary winding of this transformer TrG, normally closed push button contact 116, altimeter controlled contact 117 assuming the 3000 foot altitude position, wire 118, plate 3 of the electron tube RBET3, through the electron beam of this tube to the cathode Ca thereof, front contact 119 of the relay 60, front contact 120 of the relay PR2, plate 2 of this tube RBET6, through the electron beam of this tube to the cathode Ca of this tube RBET6 to the other and grounded terminal (—) of this same source of current. Since the transformer TrG is tuned to permit only the free flow of energy modulated at the clear traffic condition rate its secondary winding has energy induced therein which is rectified by the associated full-wave rectifier from whence it may flow to the relay GR. This flow of current causes relay GR to pick up and close its front contact 122 to light the green light G in the cab of the airplane.

The pilot is therefore informed that traffic conditions in advance for altitude 3000 is favorable through the block extending from fix 1 to fix 2 and that he may proceed at this altitude without the danger of colliding with another airplane. For obvious reasons the airplane when flying at other altitudes in the block extending from fix 1 to fix 2 may have its signals G, Y and R controlled in like manner, under each condition of which the repeater relay PR2 will assume a picked up position. If, however, an airplane enters the block extending from fix 2 to fix 3 the relay PUR2 will not be picked up but instead the relay PUR3 will be picked up because the initiating space radiation energy transmitted from the ground to the airplane when flying over the fix 2 can only be transmitted during the ninth, tenth, eleventh and twelfth impulse period of the 16 impulse cycle, and for altitude 2000 traffic manifesting energy will only flow during the tenth impulse of this 16 impulse cycle. Similarly, impulses 13 to 16 inclusive will be used for the block extending from fix 3 to fix 4 and impulse periods 1 to 4 will be used for the block extending from fix 4 to fix 5 (also fix 0 to fix 1) in the proposed system. Also, the first impulse of any one of these groups will be used for altitude 1000, the second impulse of such group will be used when the airplane flies at altitude 2000 and the third and fourth impulse of such group will be used if the airplane flies at altitudes of 3000 and 4000 feet respectively.

*Structure—Figs. 3A and 3B.*—The modified embodiment of the invention illustrated in Figs. 3A and 3B is substantially the same as the system illustrated in Figs. 1B and 1C except that the pick-up condition and traffic conditions of clear (green), caution (yellow) and danger (red) are manifested in the Figs. 3A and 3B structure by the time-of-impulse method whereas these conditions are characterized in the Figs. 1B and 1C structure by the modulation of the carrier frequency method. In other words, the tone generator TG and its three tuning elements PU, R, Y and G (Fig. 1B) have been replaced by four rotating electron beam tubes of which only two, namely, tubes RBET10 and RBET11 for altitudes 3 and 4 respectively have been shown in Fig. 3A of the drawings. These tubes are associated with specific altitudes, there being similar tubes required for altitudes 1 and 2. Similarly, the tuning transformers TrR, TrY and TrG and their associated rectifiers (Fig. 1C) have been replaced by the rotating electron beam tube RBET12 (Fig. 3B).

Referring to Fig. 3A since the rotating beam electron tubes RBET1 and RBET10 for the circuit leading to plate PUP, for instance, are connected in series to constitute a keying circuit the wiring associated with the approach relays AR3 and AR4 of Fig. 3A is somewhat different from that shown in Fig. 1B of the drawings, but these differences will be brought out in connection with the operation of the system. It is of course understood that the home relays HR3 and HR4 shown in Fig. 3A as well as their associated distant relays DR3 and DR4 are controlled in the same manner as are similar relays illustrated in Fig. 1B of the drawings.

*Operation—Figs. 3A and 3B.*—Referring to Fig. 3A it will be observed that traffic conditions in advance of the fix 2 illustrated therein are favorable for both altitudes 3000 and 4000 feet by reason of the fact that the home relays HR3 and HR4 and their associated distant relays DR3 and DR4 all assume their energized position. By reason of the fact that the approach relay AR3 assumes its energized position whereas the approach relay AR4 assumes its deenergized position it must be assumed that altitude 3 has already become occupied by an airplane whereas altitude 4 has not. We will assume that this airplane occupying altitude 3 is the airplane APPP3 illustrated in Fig. 3B of the drawings. Referring again to Fig. 3A it will be observed that adjacent the space radiation energy emitted by the antenna TAF11 has been applied a legend "pulses 10 and 13 for altitudes 3 and 4 respectively." This legend signifies that the radio energy emitted by the antenna TAF11, which is emitted in cycles of 16 impulses each, has at least impulses 10 and 13 thereof present under the conditions assumed. The impulse 10 belongs with altitude 3, meaning the second impulse of the third group of four impulses (9, 10, 11 and 12) of the 16 impulse series under consideration. The second impulse 10 of this third group of impulses is used because traffic conditions in advance are favorable and the second plate, namely, the plate GP of the rotating beam electron tube RBET10 is used. The impulse 13 on the other hand signifies that this impulse belongs to the fourth group of impulses, namely, impulses 13 to 16 inclusive, and since the first plate PUP of the rotating beam electron tube RBET11 is used, relay AR4 being down, this will result in the first impulse of the fourth group of impulses, namely, impulse 13 being used.

Referring now to both of Figs. 3A and 3B let us assume that the airplane APPP3 illustrated in Fig. 3B and flying at altitude 3000 has not yet passed the fix 1 illustrated in Fig. 3A (relay AR3 still down) and let us further assume that this airplane is just about to fly over this fix 1. As the airplane APPP3 passes over fix 1 of Fig. 3A the space radiation energy emitted by the fan marker antenna TAF1 is received by the fan marker antenna FanRA mounted on the lower side of the airplane APPP3 (Fig. 3B). Since this space radiation energy is of frequency F1 it will be received by the receiver RF1 (Fig. 3B) which will in turn apply potential to the upper winding of the repeater relay PR11. This potential will, however, not cause current flow so long as the contact 130 of the pick-up relay PUR11 is open. At the time under consideration space radiation energy is also transmitted during the ninth impulse of the 16 impulse cycle, it being assumed that the approach relay AR3 is still deenergized as it would be under the conditions assumed. This ninth impulse flows through the back contact 132 of the approach relay AR3 and through a circuit which may be traced from the terminal (+) of a suitable source of direct current, back contact 133 of the approach relay AR3, wire 131, plate 3 of the rotating beam electron tube RBET1, the electron beam and cathode Ca of this tube, wires 134 and 135, back contact 132 of relay AR3, wire 136, plate PUP, electron beam and cathode Ca of the rotating beam electron tube RBET10, wire 137, through suitable apparatus of the radio transmitter TF11 to the other and grounded terminal (—) of this same source. The transmitter TF11 will therefore emit an impulse of space radiation energy at least during the ninth impulse period of the impulse cycle. A similar impulse is transmitted during the thirteenth impulse on the assumption that approach relay AR4 assumes its deenergized position. This energy will be received by the antenna RA (Fig. 3B) and since this energy is of radio carrier frequency F11 it will flow into the receiver-detector R—D11 from which the modulation frequency will flow through the tuned transformer Tr11 and will result in the picking up of the pick-up relay PUR11 through the medium of its associated full-wave rectifier. This will result in the closure of its front contact 130 above mentioned so that the space radiation energy transmitted by the fan marker and received by the antenna FanRA and receiver RF1 will cause current to flow through the upper winding of the repeater relay PR11 and cause its energization. In other words, the space radiation energies emitted by antennas TAF1 and TAF11 cooperate to pick up the relay PR11.

With this repeater relay PR11 once picked up it will be stuck up through a stick circuit heretofore traced in Figs. 1C and 2C. A portion of the energy received by the receiver-detector R—D11 (Fig. 3B) will flow through the front contact 139 of this relay PR11 and front contact 140 of the relay 69 to the grid g of the rotating beam electron tube RBET3. Since the impulse under consideration is the ninth impulse of the 16 impulse cycle it will flow during the third group of impulses 9 to 12 inclusive and therefore will flow during the time that the electron beam of this tube RBET3 is wiping over the plate 3 of this tube. Energy, having its modulation removed therefrom, can therefore flow through the modulation filter MF to the grid g of the rotating beam electron tube RBET4. This flow of current causes this last mentioned tube to become active to cause the flow of current through a circuit which may be traced from the terminal (+) of a suitable source of direct current through wire 141, the apparatus of the radio transmitter TF21, front contact 142 of the repeater relay PR11, wire 143, altimeter controlled contact 144 assuming the 3000 foot altitude position, plate 3 of the rotating beam electron tube RBET4 through the electron beam thereof to the cathode Ca of this tube to the other and grounded terminal (—) of this same source of current. This activation of the transmitter TF21 causes space radiation energy to be emitted by the transmitting antenna TA as a result of which the receiver-detector R—D21 (Fig. 3A) is activated through the medium of the antenna RAF21. This flow of current causes a positive impulse to be applied to the grid g of the rotating beam electron tube RBET2 so as to render this tube conducting. This results in current flowing in a circuit which may be traced from the terminal (+) of a suitable source of direct current, winding of the approach relay AR3, wire 146, plate 3 of electron tube RBET2, the electron beam and cathode Ca of this same tube, wire 147, back contact 148 of the relay AR3, through a suitable resistance 149 to the other terminal (—) of the same source of current. This flow of current will result in the picking up of the approach relay AR3. The result is that thereafter the current for the circuit just traced instead of passing through the resistance 149 to the terminal (—) it will flow through the front contacts 148, 150 and 151 of the relays AR3, DR3 and HR3, respectively, through the plate GP and cathode Ca of the electron tube RBET11 and through wire 137, through the transmitter TF11 to the terminal (—). This will result in the emission of current during the tenth impulse of the 16 impulse cycle instead of the ninth as was the case before relay AR3 picked up. This energy flow during the tenth impulse of the impulse cycle results in space radiation and current flow from the receiver-detector R—D11 (Fig. 3B) through front contacts 139 and 140 of the relays PR11 and 69, respectively, to the grid g of the electron tube RBET3. Since this impulse occurs during the tenth time-of-impulse period of the impulse cycle, current will flow from the terminal (+), through the winding of the relay GR, plate GP of the rotating beam electron tube RBET12, electron beam and cathode Ca of this same electron tube, wire 153, push button 154, altimeter controlled contact 155 assuming the 3000 foot altitude position, wires 156 and 157, plate 3 of the rotating beam electron tube RBET3, through the electron beam and cathode Ca of this same tube, which cathode is connected to the grounded (—) terminal of this source of current. The flow of current in this circuit causes the relay GR to be picked up as a result of which the front contact 159 is closed, resulting in the illumination of the green lamp G.

It is thus seen that when the airplane first entered the block extending from fix 1 to fix 2 (Fig. 3A) space radiation energy was emitted during the ninth and thirteenth impulse from the transmitter TAF11 whereas it was transmitted during the tenth impulse after the approach relay AR3 was picked up. It should be observed that this picking up of the relay AR3 resulted in the rendering of the rotating beam electron tube RBET1 inactive insofar as plate 3 thereof is concerned. This is desirable because altitude 3000 is now occupied and there is no longer need of functioning of the rotating beam RBET1 insofar as altitude 3000 is concerned. This tube RBET1 is, however, still active insofar as plate 4 thereof is concerned because altitude 4000 is presumed to be unoccupied within the limits of the block extending from fix 1 to fix 2 (Fig. 3A).

It is of course readily understood from the Fig. 3A construction that had traffic conditions for altitude 3000 been unfavorable to the extent such that the second block in advance would have been occupied by an airplane, this would have been manifested by a deenergized condition of the distant relay DR3. This would have caused energy to have been transmitted during the eleventh time-of-impulse period instead of the tenth. Also had traffic conditions been dangerous resulting in both of the relays HR3 and DR3 being deenergized space radiation would have occurred during the twelfth time-of-impulse period. In other words, the pick-up condition and three different kinds of traffic conditions for altitude 3000 are transmitted during the impulse periods 9–12 inclusive. Similarly, like conditions are transmitted for the fourth altitude during the time-of-impulse periods 13 to 16 inclusive.

Referring now to Fig. 3B it is of course understood that the altimeter controlled contacts 144 and 155 assume the third position in the drawing because the airplane APPP3 is presumed to be flying at the 3000 foot altitude. Were this airplane flying in the 4000 foot altitude these contacts 144 and 155 would assume the fourth position and would conduct current to the plates 4 of the tubes RBET4 and RBET3 respectively. Similarly, had caution traffic conditions existed instead of clear traffic conditions current would have been flowing through the plate YP instead of the plate GP of the rotating beam electron tube RBET12 (Fig. 3B) which would have resulted in the yellow light Y instead of the green light G being lighted. Similarly, had danger traffic conditions existed such traffic conditions would have resulted in the flow of current during the twelfth time-of-impulse period and this would have resulted in the picking up of the relay RR and in the lighting of the light R.

If the pilot desires to observe traffic conditions in some other altitude he will operate his hand switch 160 to a position corresponding to the altitude the traffic conditions of which he wants to observe and he will thereafter depress the push button 154 so as to connect the wire 153 leading to the rotating beam electron tube RBET12 to the proper altitude plate of the electron tube RBET3.

*Structure—Fig. 4.*—In Fig. 4 has been illustrated apparatus for indicating in the cab of an airplane AP whether or not the pilot is flying directly over the route and if not to what extent he is deviating from such route. This route flying apparatus illustrated in Fig. 4 is contemplated being used in connection with the ground located transmitter located at the exit end of each block in the systems illustrated in Figs. 1B, 2B and 3A it being proposed that another radio transmitter be provided at the entrance end of each block which radiates space radiation energy forwardly and upwardly toward an airplane flying in that block. In other words, the airplane carried apparatus shown in Fig. 4 requires space radiation energy transmitted thereto from the front and from the rear simultaneously but at different carrier frequencies and the systems illustrated in Figs. 1B, 2B and 3A already provide the necessary rearwardly directed radiation at the exit end of each block so that only a forwardly directed antenna need be provided at the entrance end of the block which emits space radiation energy of a different carrier frequency than is for instance transmitted by antennas such as antenna TAF11 (Figs. 1B, 2B and 3A). Such an additional antenna TAF25 has been illustrated in Fig. 2A of the drawings.

Referring now to Fig. 4 the airplane carried apparatus includes the usual and well known automatic direction finding instrument ADF (Fig. 4). This instrument is provided with a directional antenna 174 and a sense antenna 170 and this instrument also includes a pointer 171 which is operated by its vertical shaft 179 and which will point to the radio ground station that emits carrier frequency to which both the directional antenna 174 and the sense antenna 170 of this instrument ADF are tuned. The exact construction of this automatic direction finding instrument is deemed unnecessary because it is well known in the art and for further description thereof attention is directed to pages 207–219, of Aviation Radio, by Henry W. Roberts, 1945.

In accordance with the invention illustrated in Fig. 4 this automatic direction finding instrument has physically mounted upon the indicator shaft 179 thereof a directional antenna 172. This directional antenna has its output wires connected to an amplifier 173 which has its output leads connected to the primary windings 175 and 176 of the transformers Tr1 and Tr2, respectively. This directional antenna 172 is tuned to the same frequency as is emitted by a ground located radio transmitter located at the entrance end of the block under consideration, namely, to the rear of the airplane. This airplane carried apparatus also includes a second receiver-amplifier 177 which is fed by energy from a sense antenna 178. This receiver-amplifier 177 is also tuned to the same carrier frequency as is the directional antenna 172. The sense antenna 178 is, however, omni-directional whereas the antenna 172 is highly directional. The output leads from the receiver-amplifier 177 are connected to the primary windings 185 and 186 of the transformers Tr1 and Tr2 respectively. It should be observed that the primary windings 185 and 186 are connected to the output leads of the receiver-amplifier 177 in like fashion whereas the windings 175 and 176 of these same transformers are connected to the output leads of the receiver-amplifier 173 in unlike fashion. From this construction it is readily seen that under those conditions where the windings 175 and 185 are energized accumulatively from the ground station in the rear this same ground station will cause energy to flow in the windings 176 and 186 in bucking relationship, and vice versa. When the airplane under consideration is flying precisely over the route the directional antenna 172, which is preferably of the circular coil type, is disposed crosswise of the route and zero energy is induced therein from the ground located radio transmitter to the rear of the airplane. Under this same circumstance energy will be received by the omni-directional antenna 178 so that the receiver-amplifier 177 delivers energy through its output circuit to the primary windings 185 and 186 of transformers Tr1 and Tr2 respectively.

In other words, energy of the same value (zero energy being induced by primary windings 175 and 176) is induced in the secondary windings 181 and 182 of the transformers Tr1 and Tr2 respectively. With like potentials applied to the grids g of the amplifying tubes T1 and T2 like potentials will also result on the deflecting plates 183 and 184 of the cathode ray viewing tube or cathode ray scope K. With like potentials applied on the two deflecting plates 183 and 184 the lighted spot 180 on the cathode ray screen will assume the center position as illustrated in Fig. 4.

If now, on the other hand, the airplane should veer to the left of the route the directional antenna 172 would no longer receive zero energy from the ground located station in the rear so that it would at least to a slight extent render the receiver-amplifier 173 active. This would cause the primary windings 175 and 176 of the transformers Tr1 and Tr2 to be lightly energized and this energy would in the case of the transformer Tr1 subtract from the excitation supplied by the winding 185 so that the output from the transformer Tr1 would become less whereas the output for the transformer Tr2 would become greater than it was before, due to the fact that the energies applied to the windings 176 and 186 of this transformer Tr2 are accumulative. With the amplifying tube T2 passing more current than the amplifier T1 the deflecting plate 184 will become less positive than the deflecting plate 183, as a result of which the electron beam in this cathode ray scope K will be bent toward the left so that the spot 180 will be located slightly to the left of the location illustrated in the drawing. Should, however, the airplane veer to the right off of the route over which it is to fly the phase of the current induced in the directional antenna 172 will be shifted 180° as a result of which the energies applied to the windings 175 and 185 of the transformer Tr1 will become accumulative and the energies applied to the windings 176 and 186 of the transformer Tr2 will become subtractive as a result of which the tube T1 will draw more current than will tube T2, the deflecting plate 183 will therefore become less positive than the deflecting plate 184 and the spot 180 on the screen of the cathode ray scope K will be shifted to the right. In other words, the cathode ray scope K will by the location of its lighted spot 180 on the screen thereof inform the pilot whether he is flying to the left or to the right of the route over which he is to fly.

Figure 5C:
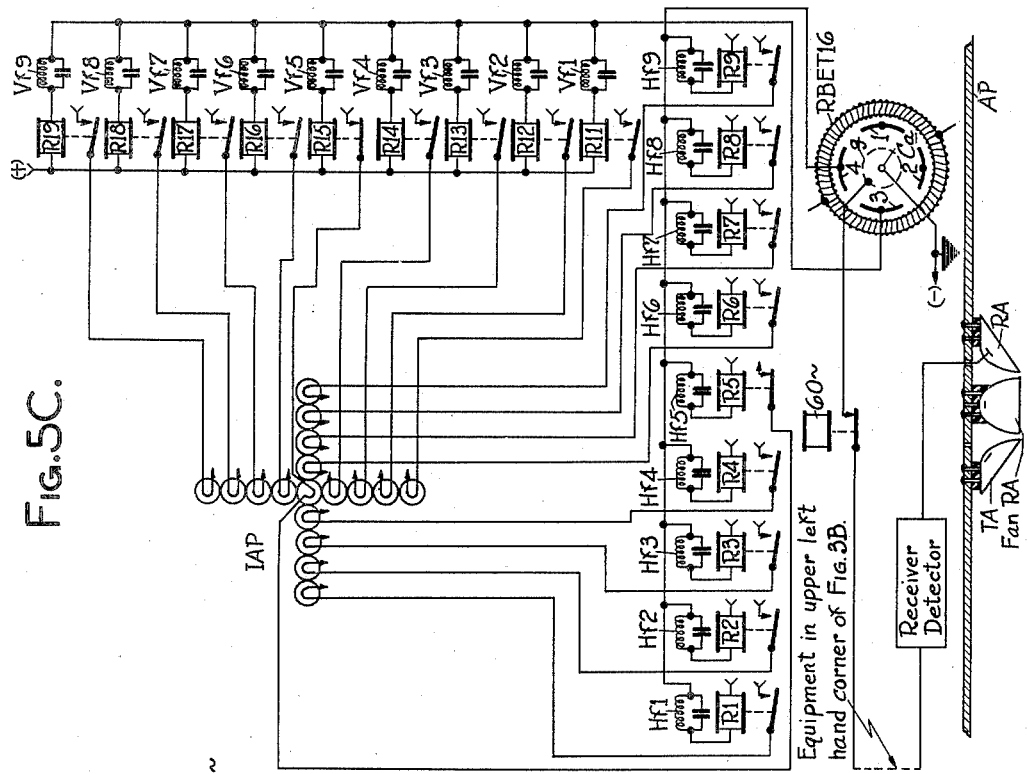
Figure 5B:
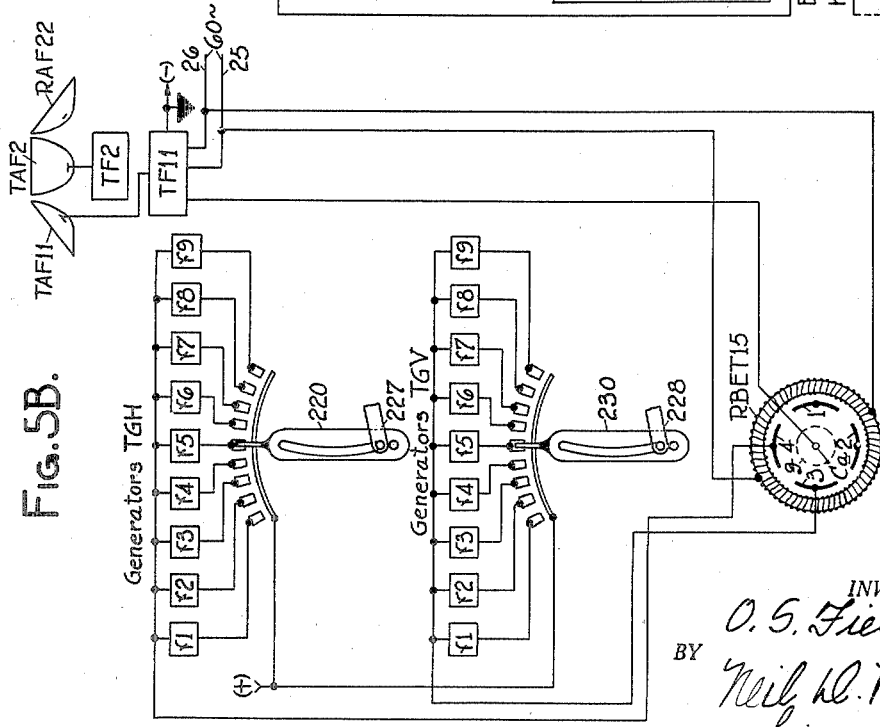

*Structure—Figs. 5A, 5B and 5C.*—In Figs. 5A and 5B of the drawings has been illustrated the ground located apparatus and in Fig. 5C has been shown the airplane carried apparatus of a blind landing system involving ground located automatic direction finding instruments. These automatic direction finding instruments have not been specifically illustrated but their shafts ADF1, ADF2, ADF3 and ADF4 have been shown in Fig. 5A of the drawings. These automatic direction finding instruments are either radar controlled or are instruments of the usual construction which respond to radiant energy emitted by an antenna carried by the airplane to be landed. All that it is necessary to know about these ADF instruments is that each of these four automatic direction finding instruments will point at the airplane to be landed. Since the instruments having shafts ADF1 and ADF2 are themselves positioned to have their shafts vertical and are located on opposite sides of a line leading to the runway it is obvious that these two automatic direction finding instruments can manifest whether or not the airplane is on this line, or is to the right or to the left thereof.

Similarly, the other two automatic direction finding instruments whose shafts ADF3 and ADF4 are disposed horizontally are located below and above respectively of the glide path down which an airplane is to fly in making its landing. These latter automatic direction finding instruments have their stationary coils arranged parallel to the glide path and the coils of the automatic direction finding instruments ADF1 and ADF2 having vertical shafts have their stationary coils parallel to the center line of the runway. These automatic direction finding instrument shafts ADF1, ADF2, ADF3 and ADF4 support respectively movable coils 201, 202, 203 and 204 which are supported in stationary coils 205, 206, 207 and 208 respectively. It is readily understood that if these coils 201 and 202 are in their normal parallelly arranged position, as would be the case if an airplane were an infinite distance away from these automatic direction finding instrument shafts ADF1 and ADF2 that the coupling between coils 201 and 205 and between coils 202 and 206 would be a maximum. This is true also of coils 203—207 and 204—208. The variometer coils 201, 202, 203 and 204 are respectively connected to the primary windings of transformers Tr5, Tr6, Tr7 and Tr8. The transformer Tr5 is provided with secondary windings 211 and 215, the transformer Tr6 is provided with secondary windings 212 and 216, the transformer Tr7 is provided with secondary windings 213 and 217, and the transformer Tr8 is provided with secondary windings 214 and 218.

Four meter mechanisms MMH1, MMH2, MMV1 and MMV2 are provided. It is readily seen that the meter mechanisms MMH1 and MMV1 are non-polar and will operate against the springs 221 and 223, respectively, to an extent dependent on the value of the current applied thereto; whereas, the meter mechanisms MMH2 and MMV2 operate in a direction dependent upon the instantaneous polarity of the alternating current as well as its quantity and they operate in either of two directions against the tension of springs 222 and 224 respectively. This will be readily understood because of the local energizing circuits 225 and 226 provided. These circuits feed energy directly from the source AC to coils within these meter mechanisms. It is also readily understood by studying the circuits that the secondary windings 211 and 212 of transformers Tr5 and Tr6 are connected in series accumulatively; whereas, the secondary coils 215 and 216 of these same transformers are connected in bucking relationship. Likewise for transformers Tr7 and Tr8 the secondary windings 213 and 214 are connected in series accumulatively whereas their secondary windings 217 and 218 are connected in bucking relationship. From this consideration it is readily seen that the circuit including the secondary windings 213 and 214 as well as 211 and 212 will have greater energy induced therein as the airplane, the presence of which they are manifesting, is farther away so that these meter mechanisms MMH1 and MMV1 operate against their springs 221 and 223 respectively to the greatest extent as the airplane approaches an infinite distance from the landing point. As shown in the drawings it is assumed that the airplane under consideration is a great distance away and that these meter mechanisms MMH1 and MMV1 have their springs 221 and 223 extended to substantially a maximum amount. This results in the links 227 and 228 assuming their lower most position so as to establish a maximum multiplying leverage between the meter mechanisms MMH2 and MMV2 and their respective contact arms 220 and 230. This is as it should be in that these contact arms 220 and 230 are intended to manifest the distance an airplane is away from its glide path for when an airplane is the farthest away from the landing field the angle of the line on which the airplane is located with respect to the glide path is the smallest for like distances of actual veering away from such glide path. In other words, the farther the airplane is away from the runway the larger will be the lever ratio between the meter mechanism MMH2 and its associated contact arm 220 and between the meter mechanism MMV2 and its associated contact arm 230.

Referring now to the meter mechanisms MMH2 and MMV2 it will be observed that since the transformer secondary supplying energy to these meter mechanisms are connected in bucking relationship that these meter mechanisms MMH2 and MMV2 will receive no energy if the airplane is exactly on the glide path. The meter mechanism MMH2 will receive energy of one instantaneous polarity when the airplane flies to the right of the glide path and will receive energy of another instantaneous polarity when the airplane flies to the left of the glide path, so that the contact arm 220 is operated to the right or to the left of its center position depending upon whether the airplane flies to the right or the left of the glide path, respectively. Similarly, the meter mechanism MMV2 will have energy supplied thereto of one instantaneous polarity or the other dependent upon whether the airplane flies above or below the glide path 200 so that the contact arm 230 will be moved to the right or the left of its center position as the airplane flies above and below the glide path 200 respectively.

As illustrated the contact arm 220 operated by the horizontal meter mechanism MMH2 through a leverage determined by meter mechanism MMH1 controls the circuits to the horizontal lamps of a cross type indicator IG whereas the contact arm 230 operated similarly by the vertical meter mechanisms MMV1 and MMV2 controls circuits to the vertical lamps of this cross type ground located indicator IG. It will be observed that the middle lamp in the vertical row is the same lamp as the middle lamp in the horizontal row and it will also be observed that this center lamp 132 is controlled by both of the contact arms 220 and 230 and that this center lamp is lighted when both of these arms assume their middle position. This ground located indicator IG may be used for the purpose of transmitting orally, as by a radio telephone, instructions to the pilot as to how he shall maneuver his airplane in flying down the glide path. For instance, if a lamp in the horizontal row to the right of the center lamp 132 is lighted the pilot will be informed that he is to the right of the glide path whereas if a lamp to the left of the center light 132 be lighted the pilot is advised that he is flying to the left of the glide path. Similarly, if a lamp above this center light 132 is lighted the pilot will be informed that he is flying above the glide path whereas if the lamp lighted in the vertical row is one below this center light 132 he will be advised that he is flying below the glide path.

Instead of using these contact arms 220 and 230 for the purpose of controlling a ground located indicator IG, as shown in Fig. 5A, these contacts may be used for controlling a ground located radio transmitter TF11 (Fig. 5B) which will transmit to the airplane space radiation pulses transmitted at impulse times and modulated to frequencies so as to characterize the location of the airplane with respect to the glide path. In the particular embodiment of the invention illustrated this radio transmitter TF11 is fed by a circuit which is punctuated by the rotating beam electron tube RBET15, the plates 3 and 4 of which tube are connected to tone generators TGV and TGH, respectively, which tone generators each include tone frequency generating units f1 to f9, inclusive. In other words, when the electron beam is in communication of plate 3 of the tube RBET15 the airplane AP is placed on the signal IAP (see Fig. 5C) located on the airplane with respect to its vertical disposition as determined by contact arm 230 selecting one of the frequencies f1 to f9, inclusive, whereas when this electron beam is in communication with the plate 4 a pulse will be transmitted the frequency of which characterizes the horizontal location of the airplane as determined by the contact arm 220 selecting one of the frequencies f1 to f9 inclusive of the tone generator TGH. This energy is received on the airplane by the antenna RA heretofore mentioned and feeds energy under airplane landing conditions as may be determined by suitable double throw switches on the airplane which connect the proper apparatus with the antenna RA. This space radiation energy may then, through the medium of the rotating beam electron tube RBET16, be conducted either to the horizontal tuned units Hf1 to Hf9, inclusive, as would be the case when the electron beam sweeps over the plate 4 of this tube whereas when the electron beam sweeps over the plate 3 of this tube energy may flow through one of the variously tuned units Vf1 to Vf9, inclusive. It will be observed that the tuned units Hf1 to Hf9 are successively connected to and control relays R1 to R9, respectively. Whereas the tuned units for manifesting vertical location of the airplane and designated Vf1 to Vf9 are successively connected to and control relays R11 to R19, respectively. It will be seen that front contacts of relays R1 to R9 inclusive, control the horizontal lamps in the airplane located indicator IAP whereas front contacts of relays R11 to R19, inclusive, control the lamps located in a vertical row of this airplane carried indicator IAP. In other words, the airplane carried apparatus illustrated in Fig. 5C is an illustration of how an airplane located indicator IAP may be controlled through the medium of a radio communication system by the contact arms 220 and 230 of the ground located automatic direction finding instrumentalities in the same way as these contact arms 220 and 230 may control the ground located indicator IG illustrated in Fig. 5A of the drawings.

As already mentioned it is to be understood that the apparatus illustrated in Figs. 5B and 5C employs as much of the apparatus illustrated in Figs. 1A, 1B, 1C, 2A, 2B, 2C and 3A and 3B, as is possible. This may be accomplished by the employment of suitable switching apparatus whereby that portion of the apparatus which is used for cab signal purposes and which may also be used for blind landing purposes may be connected to its associated apparatus if and when desired.

*Operation—Figs. 5A, 5B and 5C.*—Referring particularly to Fig. 5A of the drawings let us assume that there is an airplane attempting to make a landing by flying over the glide path 200 and that this airplane is at a great distance away from the runway 199 illustrated in Fig. 5A. As heretofore pointed out when this airplane is at a great distance from the apparatus the coils 201 and 202 associated with the horizontal ground located automatic direction finding instruments are substantially parallel as a result of which the sum of their voltages is very large whereas the difference of their voltages depends on the extent of sidewise departure from the glide path. For this reason the meter mechanism MMH1 is energized by large currents to establish a high multiplying ratio between the meter mechanism MMH2 and the free end of the contact arm 220 and whereby such (+) or (−) energies as are applied to the meter mechanism MMH2 produce (+) or (−) indications by swinging the arm 233 to the right or left, as the case may be, to cause substantial arcs of movement of contact arm 220 in spite of small arcs of movements of arm 233. In order to get more pronounced results in indicating the distance the airplane is away from the landing strip a gear reduction between coil 201 and shaft ADF1 may be provided, if desired. For instance, it may be assumed that shaft ADF1 has a maximum swing of 45 degrees whereas it may be desirable under certain situations to swing the coil 201 through an arc twice that large or 90 degrees. In this case a speed-up gear ratio of one to two would be provided. What has just been said about veering horizontally from the glide path 200 as indicated by the apparatus shown in the upper part of Fig. 5A, is also true of vertical wanderings. For instance, vertical veering off of the glide path 200 produces similar indication results which are manifested by apparatus shown in the lower portion of Fig. 5A.

As this airplane under consideration moves in more closely to the runway 199 illustrated the coils 201 and 202 assume positions farther away from parallel as a result of which not only is the current induced therein smaller but the difference in the value of these currents as reflected in the circuit leading to the meter mechanism MMH2 is smaller. In other words, there is a tendency for the meter mechanism MMH2 to produce a smaller sweep of its operating arm 233 as the airplane gets nearer and the effect of this smaller movement will affect the arm 229 still less because the link 227 assumes a higher position in the slot of the arm 229 and the multiplying effect of the lever is less. In other words, as the airplane comes in closer to the runway its result upon the meter mechanism MMH2 is less pronounced and the reduced energy applied to the meter mechanism MMH1 causes a still lower lever multiplying ratio to exist. As the result of this construction the contact arm 220 substantially accurately indicates the distance, say in feet, that the airplane is flying away from the glide path 200. Stating this in different words the meter mechanism MMH1 performs a distance measuring and indicating function whereas the meter mechanism MMH2 performs a left and right movement indicating function. By combining the operations of these two meter mechanisms MMH1 and MMH2 a single and new result is produced, namely, the distance the airplane is displaced horizontally from the glide path 200 is indicated.

What has been said about the airplane veering horizontally away from the glide path 200 as determined by the apparatus shown in the upper part of Fig. 5A of the drawings is likewise true insofar as veering vertically away from this glide path 200 is concerned. This latter function is accomplished by the apparatus shown in the lower part of Fig. 5A of the drawings.

Explanation of the operation of the apparatus illustrated in Figs. 5B and 5C is deemed unnecessary in that the communicating devices employed are similar to those shown in Figs. 1A, 1B, 1C, 2A, 2B, 2C, 3A and 3B for which reason it should be understood how the airplane carried indicator IAP is controlled by contact arms 220 and 230 through the medium of the radio communicating apparatus illustrated.

Rotating beam electron tubes have been shown applied to various uses in the present invention. It should be understood, however, that the invention is broad and that it is not limited to such specific instrumentalities, and that any other means such as rotating contact arms, stepping mechanical relays or stepping tube relays (gas filled tubes) may be used for this purpose. The disclosure should therefore be considered exemplarily only and as means to disclose the nature of the invention rather than a showing of the structure necessarily used in practicing the invention.

Several embodiments of an airplane cab signalling system have been illustrated for the purpose of disclosing the underlying principles of the invention rather than its scope. That is, the invention may be practiced by using distinctive time-of-impulse demarkation and by modulating radio carrier frequencies distinctively and these two methods of distinctively characterizing and distinctively decoding space radiation energy have been variously combined in Figs. 1, 2 and 3 of the drawings. The blind route delineating apparatus illustrated in Fig. 4 contemplates using part of the apparatus of Figs. 1, 2 or 3 and for this reason is a subcombination of the whole disclosure, as is also true of the blind landing apparatus disclosed in Figs. 5A, 5B and 5C.

Having thus shown and described several embodiments of a combined airplane cab signalling, blind route delineating and blind landing system together with several modifications thereof it should be understood that the specific embodiments illustrated and described have not been selected to disclose the specific construction to be used in practicing the invention but have been selected to facilitate description of the nature of the invention and the principle underlying its operation and it should be understood that various changes, modifications and additions may be made in practicing the invention without departing from the spirit or scope of the invention except as required by the scope of the following claims.

What I claim as new is:

1. In air traffic control system, the combination with an air route divided horizontally into successive blocks, block identifying means including radio transmitting and radio receiving apparatus for manifesting on the airplane when such airplane enters a particular block and for conditioning airplane carried radio receiving apparatus so as to be effectively responsive to space radiated energy from ground located radio transmitting apparatus associated with that block but not from ground located radio transmitting apparatus associated with adjacent blocks, means on such airplane rendered active by said block identifying means for emitting space radiated energy receivable by ground located radio receiving apparatus associated with that block but not receivable by ground located radio receiving apparatus associated with adjacent blocks, and means for rendering said block identifying means inactive when such airplane exits from such block.

2. In an air traffic control system, the combination with an air route divided horizontally into successive blocks and vertically into successive altitudes, block identifying means including radio transmitting and radio receiving apparatus for manifesting on the airplane when such airplane enters a particular block and for conditioning airplane carried radio receiving apparatus so as to be effectively responsive to space radiated energy from ground located radio transmitting apparatus associated with that block but not from ground located radio transmitting apparatus associated with adjacent blocks, means on such airplane rendered active by said block identifying means for emitting space radiated energy receivable by ground located radio receiving apparatus associated with that block and the altitude at which such airplane is flying but not receivable by ground located receiving apparatus associated with adjacent blocks or altitudes, and means for rendering said block identifying means inactive when such airplane exits from such block.

3. In an air traffic control system, the combination with an air route divided horizontally into successive blocks, block identifying means including radio transmitting and radio receiving apparatus for manifesting on the airplane when such airplane enters a particular block and for conditioning airplane carried radio receiving apparatus so as to be effectively responsive to space radiated energy from ground located radio transmitting apparatus associated with that block but not from ground located radio transmitting apparatus associated with adjacent blocks, means on such airplane for indicating traffic conditions in advance, means associated with each block and including radio transmitting apparatus for transmitting the nature of traffic conditions in advance to any airplane having its block identifying means identifying that block for controlling the means for indicating traffic conditions on such airplane, and means for rendering said block identifying means inactive when such airplane exits from such block.

4. In an air traffic control system, the combination with an air route divided horizontally into successive blocks, block identifying means including radio transmitting and radio receiving apparatus for manifesting on the airplane when such airplane enters a particular block and for conditioning airplane carried radio receiving apparatus so as to be effectively responsive to space radiated energy from ground located radio transmitting apparatus associated with that block but not from ground located radio transmitting apparatus associated with adjacent blocks and conditioning airplane carried radio transmitting apparatus so as to transmit space radiation energy of a character to manifest the presence of an airplane in that block, means on such airplane for indicating traffic conditions in advance, means associated with each block and including radio transmitting apparatus for transmitting the nature of traffic conditions in advance to any airplane having its block identifying means identifying that block for controlling the means for indicating traffic conditions on such airplane effective only if the airplane carried radio transmitting apparatus on such airplane is manifesting its presence in that block, and means for rendering said block identifying means inactive when such airplane exits from such block.

5. In an air traffic control system, the combination with an air route divided horizontally into successive blocks, block identifying means including radio transmitting and radio receiving apparatus for manifesting on the airplane when such airplane enters a particular block and for upon conditioning airplane carried radio receiving apparatus so as to be effectively responsive to space radiated energy from ground located radio transmitting apparatus associated with that block characteristic of traffic conditions ahead of such block but not from ground located radio transmitting apparatus associated with adjacent blocks, means on such airplane rendered active by said block identifying means for emitting space radiation energy receivable by ground located radio receiving apparatus associated with that block to manifest the presence of an airplane in that block but not receivable by ground located radio receiving apparatus associated with adjacent blocks, ground located radio transmitting apparatus associated with each block for transmitting to an airplane, having its block, identifying means identifying that block space radiation energy characteristic of traffic conditions ahead of such block, and means for rendering said block identifying means inactive when such airplane exits from such block.

6. In an air traffic control system, the combination with an air route divided horizontally into successive blocks and vertically into successive altitudes, block identifying means including radio transmitting and radio receiving apparatus for manifesting on the airplane when such airplane enters a particular block and for conditioning airplane carried radio receiving apparatus so as to be effectively responsive to space radiated energy from ground located radio transmitting apparatus associated with that block but not from ground located radio transmitting apparatus associated with adjacent blocks, means on such airplane rendered active by said block identifying means for emitting space radiation energy receivable by ground located radio receiving apparatus associated with that block and the altitude at which such airplane is flying but not receivable by ground located receiving apparatus associated with adjacent blocks or altitudes, traffic condition indicating means on said airplane, ground located radio transmitting means for transmitting to any airplane having its block identifying means identifying that block space radiation energy characteristic of traffic conditions in advance in that altitude for controlling the traffic condition indicating means on such airplane, and means for rendering said block identifying means inactive when such airplane exits from such block.

7. In an air traffic control system, the combination with an air route divided horizontally into successive blocks and vertically into successive altitudes, block identifying means including radio transmitting and radio receiving apparatus for manifesting on the airplane when such airplane enters a particular block and for conditioning airplane carried radio receiving apparatus so as to be effectively responsive to space radiated energy from ground located radio transmitting apparatus associated with that block and altitude but not from ground located radio transmitting apparatus associated with adjacent blocks or altitudes and conditioning airplane carried radio transmitting apparatus so as to transmit space radiated energy of a character to manifest the presence of an airplane in that block and altitude, means on such airplane for indicating traffic conditions in advance, means associated with each block and including radio transmitting apparatus for transmitting the nature of traffic conditions in advance at that altitude to any airplane having its block identifying means identifying that block for controlling the means for indicating traffic conditions on such airplane effective only if the airplane carried radio transmitting apparatus on such airplane is manifesting its presence in that block and altitude, and means for rendering said block identifying means inactive when such airplane exits from such block.

8. In an air traffic control system, an airplane carried signal capable of indicating hold and proceed; airplane carried radio receiving, detecting and interpreting apparatus; and ground located apparatus for each of a plurality of blocks of an air route for transmitting to airplanes flying over that route and to their receiving, detecting and interpreting apparatus space radiation energy characterizing the block from which it is transmitted, the altitude for which it is intended and manifesting traffic conditions in advance for that block and altitude.

9. In an air traffic control system, an airplane carried signal capable of indicating hold and proceed; airplane-carried radio receiving, detecting and interpreting apparatus; ground located apparatus for each of a plurality of blocks of an air route for transmitting to airplanes flying over that route and to their receiving, detecting and interpreting apparatus space radiation energy characterizing the block from which it is transmitted, the altitude for which it is intended and manifesting traffic conditions in advance for that block and altitude; said radio receiving, detecting and interpreting apparatus including means controlled by an altimeter and allowing effective control of said airplane carried signal only upon the reception of space radiation energy that is intended for transmission to that altitude.

10. In an air traffic control system, an airplane carried signal capable of indicating hold and proceed; airplane carried radio receiving, detecting and interpreting apparatus; ground located apparatus for each of a plurality of blocks of an air route for transmitting to airplanes flying over that route and to their receiving, detecting and interpreting apparatus space radiation energy characterizing the block from which it is transmitted, the altitude for which it is intended and manifesting traffic conditions in advance for that block and altitude; and means at the entrance end of each block cooperating with means on the airplane to render the airplane carried receiving, detecting and interpreting apparatus responsive only to space radiation energy intended for the block in which the airplane is then flying.

11. In an air traffic control system, means partly on the ground and partly on an airplane for doing both manifesting through the medium of space radiation the presence of an airplane in a particular block section and altitude and manifesting on the airplane the conditions of traffic in advance of that airplane in that block and altitude, and means including means for making the upwardly directed space radiation dependent on downwardly directed space radiation and for making the downwardly directed space radiation dependent on the presence of upwardly directed space radiation, and means for rendering the first mentioned means effective upon the entrance of an airplane so equipped into a block section.

12. In an air traffic control system, means partly on the ground and partly on an airplane for doing both manifesting through the medium of space radiation the presence of an airplane in a particular block section and altitude and manifesting on the airplane the conditions of traffic in advance of that airplane in that block and altitude, said means including means for making the upwardly directed space radiation dependent on downwardly directed space radiation and for making the downwardly directed space radiation dependent on existence of upwardly directed space radiation, and means for rendering the first mentioned means effective upon the entrance of an airplane so equipped into a block section and for again rendering it inactive when such airplane exits from such block section.

13. In an air traffic control system, means partly on the ground and partly on an airplane for doing both manifesting through the medium of space radiation the presence of an airplane in a particular block section and manifesting on the airplane the conditions of traffic in advance of that airplane in that block, said means including means for making the upwardly directed space radiation dependent on downwardly directed received space radiation and for making the downwardly directed space radiation dependent on upwardly directed received space radiation, and means for rendering the first mentioned means effective upon the entrance of an airplane so equipped into a block section.

14. In a block signalling system for respective flight altitudes of an airway, a ground station radio transmitter for transmitting successive series of time spaced selectively modulated pulses, one pulse being transmitted for each of the flight altitudes, receiving means on an airplane including an altimeter switch responsive to the pulse of each series belonging to the altitude at which the airplane is flying, a radio transmitter on the airplane for transmitting to said ground station at a distinctive carrier frequency in response to the pulses received from said ground station, and means at the ground station effective in response to said radio transmitter on the airplane to change the modulation of pulses transmitted for the altitude at which the airplane is flying.

15. In a block signal system for air traffic control in which an airway is divided into successive blocks, ground located radio transmitting apparatus in each of the blocks, said ground located radio transmitting apparatus being effective to radiate distinctively characterized energy for adjoining blocks, airplane carried apparatus distinctively responsive to the particular character of energy received from the respective ground located radio transmitting apparatus as the airplane progresses from block to block along the airway, airplane carried radio transmitting apparatus rendered active by said receiving apparatus to transmit energy of a selected character in accordance with the particular block in which the airplane is flying, and ground located receiving apparatus for each of the blocks effective to identify an airplane as being in its block as compared to the adjoining block by the distinctive character of energy received from that airplane.

16. In a block signalling system for respective flight altitudes along an airway, ground located radio transmitting apparatus spaced at intervals along the airway and operable to transmit successive series of pulses and synchronization energy, one pulse being transmitted in each series for each of said flight altitudes, means on the ground for modulating said pulses for the respective altitudes in accordance with traffic conditions in advance at those respective altitudes, airplane carried receiving apparatus including an altimeter switch adapted to be distinctively responsive to the respective distinctive characters of transmission from the respective ground stations, said airplane carried receiving apparatus being governed by said synchronizing energy and said altimeter switch so as to be responsive only to the pulse transmitted by said ground located radio transmitting apparatus for the particular altitude at which the airplane is flying, and airplane carried signal indicating means governed in response to said airplane carried receiving apparatus.

17. In a block signalling system for respective flight altitudes along an airway, ground located radio transmitting apparatus spaced at intervals along the airway and operable to transmit successive series of pulses and synchronization energy, one pulse being transmitted for each of said flight altitudes, means on the ground for modulating said pulses for the respective altitudes in accordance with traffic conditions, airplane carried receiving apparatus including an altimeter switch governed by said synchronizing energy so as to be responsive only to the pulse transmitted by said ground located radio transmitting apparatus for the altitude at which the airplane is flying, and airplane carried visual signal indication means governed in response to said airplane carried receiving apparatus in accordance with the modulation of the pulse transmitted for the altitude at which the airplane is flying.

18. In an air traffic control system in which an airway having several flight altitudes is divided into blocks of predetermined lengths, ground station radio transmitting apparatus for each of the blocks operable to radiate energy distinctively characterized for adjoining blocks, said ground station radio transmitting apparatus being effective to transmit successive series of pulses, each series comprising a pulse for each of the flight altitudes, means associated with said ground station transmitting apparatus for normally modulating the respective pulses of each of said series at one frequency when no airplanes are present within that block at the particular elevations with which the respective pulses are associated, and for modulating the respective pulses at another frequency when an airplane is present in the associated altitude within that block, airplane carried radio receiving apparatus distinctively conditioned in response to energy radiated by said ground station radio transmitting apparatus, and airplane carried radio transmitting apparatus including an altimeter switch effective to transmit distinctive energy to the ground station indicative of the particular altitude at which that airplane is flying.

19. In an air traffic control system in which an airway having several flight altitudes is divided into blocks of predetermined lengths, ground station radio transmitting apparatus for each of the blocks operable to transmit successive series of pulses, each series comprising successive pulses for the respective flight altitudes, means associated with said ground station transmitting apparatus for modulating the respective pulses of each of said series in accordance with traffic conditions for corresponding altitudes in an adjoining block, and airplane carried radio receiving and visual indicating apparatus effective to continuously indicate traffic conditions in advance in response to the intermittent reception of pulses belonging to the particular flight altitude at which that airplane is flying.

20. In a block signalling system for respective flight altitudes along an airway, ground located radio transmitting apparatus spaced at intervals along the airway operable to transmit successive pulses, one pulse being transmitted for each of said flight altitudes, means on the ground for modulating said pulse for each altitude in accordance with traffic conditions, and airplane carried radio receiving and signalling apparatus responsive to the modulation of said pulse for the altitude at which the airplane is flying for visually indicating in the airplane the traffic conditions communicated by said ground located radio transmitting apparatus.

21. In a block signalling system for respective flight altitudes along an airway, ground station transmitting apparatus at respective spaced points along the airway operable to transmit successive series of pulses, each series comprising successive pulses for the respective flight altitudes, means associated with said ground station transmitting apparatus for modulating the respective pulses of each of said series in accordance with traffic conditions to be communicated to airplanes flying at flight altitudes for which the respective pulses are transmitted, and airplane carried receiving means effective to continuously indicate traffic conditions in response to the intermittent reception of pulses belonging to the particular flight altitude at which the airplane is flying.

22. In a block signalling system of the character described for governing traffic at respective flight altitudes along an airway, ground station radio transmitting apparatus at respective spaced points along the airway operable to transmit successive series of pulses, each series comprising successive pulses for the respective flight altitudes, airplane carried transmitting apparatus including an altimeter switch for transmitting an occupancy indication for the particular altitude in which the airplane is flying, means at each of said spaced points for modulating the respective pulses transmitted by said ground station radio transmitting apparatus at that point in accordance with conditions of occupancy of the respective altitudes transmitted by airplane radio transmitting apparatus and received at an adjoining point along the airway, and airplane carried receiving apparatus including a visual indication means effective to continuously indicate traffic conditions in response to the intermittent reception of pulses belonging to the particular flight altitude at which that airplane is flying.

23. In an air traffic control system in which an airway is divided into blocks of predetermined lengths and is divided into a plurality of flight areas within each block, ground station radio transmitting apparatus for each of the blocks operable to transmit successive series of pulses, each series comprising successive pulses for the respective flight areas within that block, airplane carried radio transmitting apparatus for each airplane flying in each block for transmitting occupancy indication energy for the particular area in which that airplane is flying, airplane carried receiving means for each airplane flying in each block for receiving said pulses from the nearest ground station transmitting apparatus and for receiving said occupancy indication energy characterizing occupancy of the next block in advance by an airplane flying at the same elevation, and airplane carried visual signalling means conditioned in response to energy received by said receiving means.

24. In an air traffic control system in which an airway is divided into blocks of predetermined lengths, a block station having ground located radio transmitting apparatus for each of the blocks effective to radiate energy distinctively characterized as compared to the energy radiated by transmitting apparatus of adjoining block stations, airplane carried transmitting apparatus including an altimeter switch for transmitting an occupancy indication for the particular altitude at which the airplane is flying, occupancy identification means for each of the blocks effective to distinctively characterize the energy radiated by said ground located radio transmitting apparatus for that block in accordance with the condition of occupancy of an adjoining block at a particular elevation, and airplane carried signalling apparatus distinctively conditioned in accordance with energy received from the particular ground located radio transmitting apparatus for the block in which the airplane is flying.

25. In an air traffic control system of the character described in which an air route is divided into successive blocks, ground located radio transmitting apparatus for each of the blocks radiating energy distinctively characterized as compared to the energy radiated by transmitting apparatus for adjoining blocks, airplane carried transmitting apparatus including an altimeter switch for when rendered effective radiating energy characterized in accordance with the occupancy of a particular altitude by the airplane, and airplane carried receiving apparatus distinctively responsive to said ground located radio transmitting apparatus for the particular block in which the airplane is flying, said airplane carried receiving apparatus rendering said airplane carried transmitting apparatus effective to transmit an occupancy indication.

26. In an air traffic control system in which an air route is divided into successive blocks, radio transmitting apparatus for each of the blocks radiating energy distinctively characterized as compared to the energy radiated by transmitters for adjoining blocks, airplane carried transmitting apparatus including an altimeter switch for radiating energy at distinctive times characteristic of the altitude at which the airplane is flying, receiving apparatus for each of the blocks distinctively conditioned in response to transmission by airplane carried transmitting apparatus within that block and at a particular altitude, occupancy identification means for each of the blocks effective to distinctively characterize the energy radiated by said radio transmitter apparatus for that block in accordance with the condition of occupancy of an adjoining block, and airplane carried signalling and receiving apparatus distinctively conditioned in accordance with energy received from said radio transmitting apparatus associated with the respective blocks as the airplane progresses along the air route.

27. In an airway traffic controlling system for a section of an air route divided vertically into a plurality of altitudes, ground located transmitting apparatus for transmitting pulses of radiant energy to the various altitudes of said section of said air route, said pulses being transmitted at time spaced intervals to distinctively characterize the different altitudes, apparatus on the airplanes for retransmitting a pulse corresponding to each pulse received but for only those pulses characterizing the altitude at which each particular airplane is flying, and ground located receiving apparatus for distinctively detecting the retransmitted pulses, whereby occupancy information distinctive as to all altitudes of said section is manifested by said ground located receiving apparatus.

28. In an airway traffic controlling system for a section of an air route divided vertically into a plurality of altitudes, ground located transmitting apparatus associated with said section for transmitting successive series of pulses of radiant energy for the plurality of altitudes, the pulses of each series being transmitted at time spaced intervals to distinctively allocate them to the different altitudes, apparatus on an airplane distinctively responsive to the pulses distinctive of the altitude at which it is then flying for transmitting respectively corresponding reply pulses, and ground located receiving apparatus for receiving the reply pulses of an airplane carried apparatus for any particular altitude to register that altitude as occupied and to govern said ground located transmitting apparatus to cause it to characterize the pulses transmitted for that altitude in accordance with the traffic conditions for the same altitude in the next section of said air route in advance.

29. In an airway traffic controlling system for an air route divided horizontally into a plurality of blocks and each block divided vertically into a plurality of altitudes, ground located transmitting apparatus associated with each block for transmitting successive series of pulses of radiant energy for the altitudes of its block, the pulses of each series being transmitted at time spaced intervals to distinctively allocate them to the different altitudes of the associated block, apparatus on an airplane distinctively responsive to the pulses allocated to the altitude at which it is then flying for the corresponding block and acting in response to the reception of each pulse for transmitting a corresponding reply pulse, ground located receiving apparatus associated with each block for receiving the reply pulses of an airplane carried apparatus within any particular altitude of that block to register that altitude as occupied, communication means interconnecting said ground located transmitting and receiving apparatus for the several blocks and governed by the ground located receiving apparatus for each block upon its registration of an occupied condition of a given altitude in that block for transmitting such information to the ground located transmitting apparatus for the next block in the rear, and circuit means for each block governed by the ground located receiving apparatus for that block in response to the registration of the occupied condition of any given altitude in its block for causing said communication system to govern the associated ground located transmitting apparatus for that block to distinctively modify the pulses transmitted for the occupied altitude in accordance with the occupied or unoccupied condition of the corresponding altitude of the next block in advance.

OSCAR S. FIELD.

REFERENCES CITED

The following references are of record in the file of this patent:

UNITED STATES PATENTS

| Number | Name | Date |
|---|---|---|
| 1,885,023 | Dieckmann | Oct. 25, 1932 |
| 2,127,954 | Dunmore | Aug. 23, 1938 |
| 2,421,106 | Wight | May 27, 1947 |